United States Patent [19]
Ishii et al.

[11] Patent Number: 5,277,287
[45] Date of Patent: Jan. 11, 1994

[54] DIRECT-COUPLING CLUTCH CONTROL METHOD FOR AN AUTOMATIC TRANSMISSION

[75] Inventors: Toshinori Ishii; Yuzo Yano; Takahiro Taki; Yoichi Furuichi, all of Kyoto; Kenji Suzuki, Okazaki, all of Japan

[73] Assignee: Mitsubishi Jidosha Kogyo Kabushiki Kaisha, Tokyo, Japan

[21] Appl. No.: 886,350

[22] Filed: May 21, 1992

[30] Foreign Application Priority Data

Dec. 20, 1990 [JP] Japan .................. 2-404430
Dec. 20, 1990 [JP] Japan .................. 2-404431
Dec. 20, 1990 [JP] Japan .................. 2-404432

[51] Int. Cl.$^5$ .................... B60K 41/16
[52] U.S. Cl. .................... 192/3.31; 192/0.076
[58] Field of Search ............ 192/0.076, 3.3, 3.31; 60/338; 364/424.4; 74/890

[56] References Cited

U.S. PATENT DOCUMENTS

| | | | |
|---|---|---|---|
| 4,428,467 | 1/1984 | Hiramatsu | 192/3.31 |
| 4,582,185 | 4/1986 | Grimes et al. | 192/0.076 |
| 4,660,697 | 4/1987 | Yoneda et al. | 192/0.076 X |
| 4,706,790 | 11/1987 | Lockhart et al. | 192/3.3 |
| 4,724,939 | 2/1988 | Lockhart et al. | 192/3.3 |
| 4,940,122 | 7/1990 | Fujieda | 192/3.3 X |
| 5,085,301 | 2/1992 | Inamura et al. | 192/0.076 |

Primary Examiner—Leslie A. Braun
Assistant Examiner—Khoi Q. Ta

[57] ABSTRACT

A direct-coupling control method capable of improving fuel efficiency by performing slip direct-coupling control of a torque converter, in which a driving force transmission of an automatic transmission is operated under an approximate direct-coupling condition that permits slight slippage of the torque converter, in a predetermined operating range of the automatic transmission such as a low speed range thereof, and capable of positively detecting and preventing direct-coupling vibration caused by deterioration of hydraulic oil or the like. In the slip direct-coupling control, an occurrence of direct-coupling vibration is detected when a variation of a slip amount changing beyond predetermined upper and lower limit values is found a predetermined number of times during a predetermined period of time, or when a variation in the rotational rate of the output shaft of the torque converter still continues even after the slip direct-coupling control is interrupted for the reason that the rotational rate has varied beyond a permissible range. Upon detection of the direct-coupling vibration, the slip direct-coupling control is inhibited.

5 Claims, 18 Drawing Sheets

DIRECT-COUPLING CLUTCH CONTROL METHOD FOR AN AUTOMATIC TRANSMISSION

BACKGROUND OF THE INVENTION

The present invention relates to a direct-coupling control method for an automatic transmission equipped with a driving force transmission which has input and output-side driving force transmitting elements normally coupled to each other through hydraulic oil for torque transmission between them. It further has a direct-coupling mechanism through which, if necessary, the transmitting elements are directly coupled to each other in a manner permitting occurrence of slip therebetween. More particularly, it relates to a direct-coupling control method which is capable of suppressing vibration caused by deteriorated hydraulic oil.

An automatic transmission mounted on a motor vehicle has a driving force transmission, e.g., a torque converter, installed between an internal combustion engine and a gear transmission. It is arranged to transmit the driving force of the engine to the gear transmission via the torque converter. The torque converter is provided with an impeller (input-side driving force transmitting element) coupled to a crankshaft of the engine for rotation in unison with a front cover of the converter, a turbine (output-side driving force transmitting element) coupled to an output shaft of the converter for torque transmission between itself and the impeller through hydraulic oil, and a direct-coupling mechanism.

The direct-coupling mechanism operates to control an amount of slip between the crankshaft and the impeller, i.e., slippage (a rotational speed difference) between the turbine and the impeller. In a predetermined operating area of the internal combustion engine, the direct-coupling mechanism serves to reduce the slip amount to zero, so as to eliminate energy loss caused by the slippage between the turbine and the impeller, thereby improving fuel efficiency. The larger the direct-coupling operating area wherein the slip amount is controlled to zero, the better the fuel efficiency will be. For this reason, even in a particular operating area of the internal combustion engine such as a low engine speed area thereof, there has been a demand for direct-coupling operation in which the slip amount is controlled to zero.

However, if the slip amount is reduced completely to zero in the particular operating area such as the low engine speed area, then body vibration called "confined noise" is generated, posing a problem of uncomfortable drive feeling. Thus, it has been proposed to employ minute-slip direct-coupling control that is designed to allow slight slippage rather than controlling the slip amount completely to zero in the particular operating area such as the low engine speed area.

In such minute-slip direct-coupling control, it is important to ensure stable control of the direct-coupling mechanism in an area with an extremely small slip amount $\Delta S$. In this connection, it is necessary to use hydraulic oil having such a characteristic that a friction factor $\mu$ of engaging elements of the direct-coupling mechanism decreases as the slip amount $\Delta S$ decreases as shown by the solid line in FIG. 1. To obtain such a characteristic, a special additive is added to the hydraulic oil. However, when the hydraulic oil deteriorates after extended use so that the friction factor suddenly increases in the minuteslippage area as shown by the broken line in FIG. 1, the minute-slip control becomes difficult, presenting problems such that hunting occurs in the slip amount, and direct-coupling vibration takes place.

OBJECTS AND SUMMARY OF THE INVENTION

An object of the present invention is to provide a mechanism control method for an automatic transmission, which method is capable of detecting and suppressing particular vibration, i.e., direct-coupling-vibration, generated in a predetermined operating area such as a low engine speed area due to, e.g., deteriorated hydraulic oil of a driving force transmission provided In the automatic transmission, whereby an adverse situation such that uncomfortable feeling is given to a driver and passengers attributable to the direct-coupling vibration can be prevented in advance.

Another object of the present invention is to provide a mechanism control method which makes it possible to achieve improved fuel efficiency by performing, in a predetermined operating area, slip control that allows minute slippage in the driving force transmission until the direct-coupling vibration develops due to deteriorated hydraulic oil or the like.

A further object of the present invention is to provide a mechanism control method which is capable of accurately detecting direct-coupling vibration, without the need of providing any special detecting device.

A still further object of the present invention is to provide a direct-coupling control mechanism method which makes it possible to improve fuel efficiency by carrying out slip control until a particular variation, corresponding to the direct-coupling vibration, takes place in the rotational rate of the output shaft of the driving force transmission because of deteriorated hydraulic oil or the like. The method further makes it possible, if the particular variation occurs in the rotational rate of the output shaft, to accurately identify whether the particular variation in the rotational rate of the output shaft has been caused by the deteriorated hydraulic oil or the like, or by a road surface condition or the like, without the need of using any special sensor such as an acceleration sensor. This prevents the particular variation in the rotational rate of the output shaft, namely, the direct-coupling vibration, caused by the deteriorated hydraulic oil or the like.

Yet another object of the present invention is to provide a direct-coupling control mechanism method which makes it possible to improve the fuel efficiency by conducting slip control until a particular variation in a slip amount in the driving force transmission, which variation corresponds to the direct-coupling vibration, repeatedly takes place due to the deteriorated hydraulic oil or the like. The method also makes it possible, if the particular variation in the slip amount repeatedly happens, to detect and prevent the particular variation in the slip amount, i.e., the direct-coupling vibration, due to the deteriorated hydraulic oil or the like, without using any special detecting device.

According to the present invention, there is provided a direct-coupling control method applied to an automatic transmission which includes a driving force transmission, installed between an internal combustion engine and the automatic transmission, and having input and output-side driving force transmission elements thereof normally, coupled to a side of the internal combustion engine and the automatic transmission respectively, and a direct-coupling mechanism for the input and output side driving force transmitting elements to be coupled to each other. The automatic transmission is operable to control an amount of slip between the input and output-side driving force transmitting elements by means of the direct-coupling mechanism and includes a control device for controlling a coupling state to be in any one of a fully direct-coupled state, a slip direct-coupled state and a non-direct-coupled state. The direct-coupling control mechanism method comprises the steps of (a)

(a) determining whether or not the internal combustion engine is running in at least one of a low rotation speed area and a decelerating area and controlling the direct-coupling mechanism to be brought in the slip direct-coupled state when it is determined that the internal combustion engine is running in at least one of the low rotation speed area and the decelerating area;

(b) determining whether or not a variation in a rotational rate of an input and output shaft of the automatic transmission goes beyond a first permissible range when the direct-coupling mechanism is controlled to be brought in the slip direct-coupled state;

(c) changing the direct-coupling mechanism from the slip direct-coupled state to the non-direct-coupled state when it is determined that the variation in the rotational rate of the input and output shaft of the automatic transmission goes beyond the first permissible range;

(d) determining whether or not the variation in the rotational rate of the input and output shaft of the automatic transmission goes beyond a second permissible range after the change to the non-direct-coupled state is made; and (e) detecting generation of direct-coupling vibration attributable to the slip direct-coupled state when it is determined that the variation in the rotational rate of the input and output shaft of the automatic transmission goes beyond the second permissible range.

Preferably, when the generation of the particular vibration is detected in the step (a), control other than the slip control is performed. For instance, non-direct-coupling control, wherein a condition such that the input and output-side driving force transmitting elements are directly coupled via the direct-coupling mechanism in a manner permitting the slippage therebetween is released, is performed. Alternatively, full direct-coupling control wherein the input and output-side driving force transmitting elements are directly coupled to each other via the direct-coupling mechanism in a manner inhibiting the slippage therebetween is performed. Further, the step (a) includes the sub-steps of (a1) monitoring the rotational rate of an output shaft of the driving force transmission when the internal combustion engine runs at the predetermined operating area, the output shaft being coupled to the output-side driving force transmitting element; (a2) releasing the condition such that the input and output-side driving force transmitting element are directly coupled via the direct-coupling mechanism in a manner permitting the slippage therebetween when a variation in the rotational rate of the output shaft goes beyond a permissible range, to thereby interrupt the slip control, and then detecting the rotational rate of the output shaft after the interruption of the slip control to determine whether the variation in the rotational rate of the output shaft falls within the permissible range; and (a3) detecting the generation of the particular vibration caused by deteriorated hydraulic oil when it is determined that the variation in the rotational rate of the output shaft after the interruption of the slip control falls within the permissible range. Preferably, the direct-coupling control method is applied to an automatic transmission operable to perform the slip control in accordance with the slip amount detected from a difference between the rotational rate of an input shaft of the driving force transmission and that of the output shaft thereof, the input shaft being coupled to the input-side driving force transmitting element. The step (a) includes the sub-steps of (a1') controlling the slip amount, by means of the direct-coupling mechanism, to the vicinity of a target slip amount falling within a predetermined range when the internal combustion engine runs in the predetermined operating area, and then storing a number of times by which a detected slip amount changes, during a predetermined time period, in a manner crossing a predetermined upper limit value which is larger than the target slip amount and a predetermined lower limit value which is smaller than the target slip amount; and (a2') detecting the generation of the particular vibration when a predetermined number of times of the change in the slip amount is detected in the sub-step (a1').

DETAILED DESCRIPTION

In the following, embodiments according to the present invention will be explained with reference to the accompanying drawings.

STRUCTURE OF THE AUTOMATIC TRANSMISSION

Figure 2:
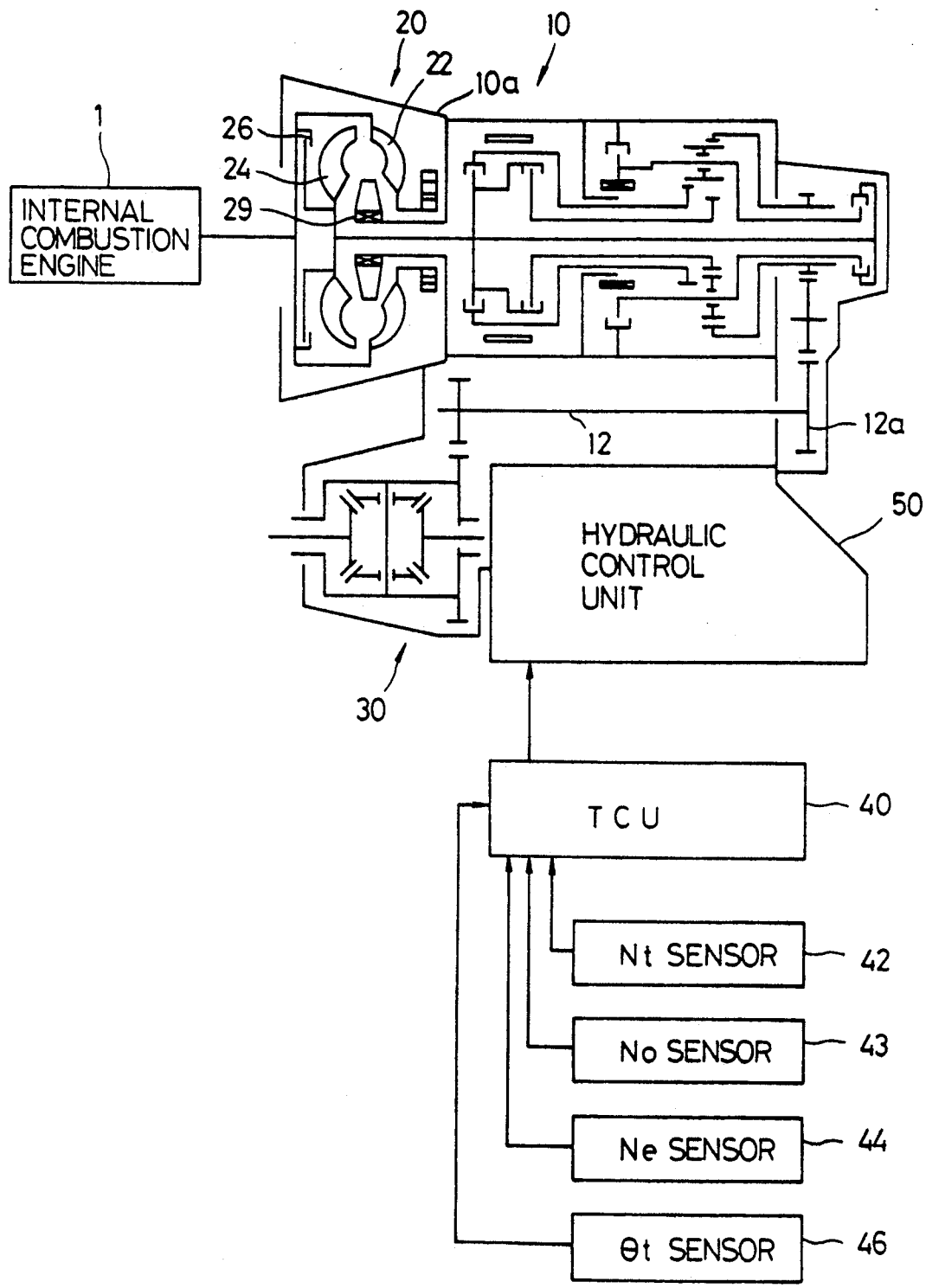
FIG. 2 is a block diagram showing the entire structure of an automatic transmission to which a direct-coupling control method according to the present invention is applied.

FIG. 2 shows the entire structure of an automatic transmission (automatic speed change gear) for a motor vehicle to which a direct-coupling control method according to a first embodiment of the present invention is applied. The automatic transmission mainly comprises a four-speed gear transmission (speed change gear drive) 10 with one-speed for reverse; a torque converter 20 installed between the gear transmission 10 and an internal combustion engine 1 and serving as a driving force transmission; a differential 30 which is, on one hand, coupled to an output shaft of the gear transmission 10 via a transfer shaft 12, and is, on the other hand, coupled to an axle shaft of front wheels; a hydraulic control unit 50 for supplying hydraulic oil to clutch and braking unit of the gear transmission 10, a direct-coupling mechanism (mentioned later) of the torque converter, etc.; and a transmission control unit (hereinafter referred to as "TCU") 40 for outputting control signals to the hydraulic control unit 50 to control the hydraulic oil pressure supplied to the direct-coupling mechanism of the torque converter 20, etc.

The torque converter 20 of this embodiment is equipped with a slip-type direct-coupling clutch (damper clutch) 26 serving as the direct-coupling mechanism. Further, the hydraulic control unit 50 is equipped primarily with a shift valve (not shown) whose valve position is changed by driver's shifting operation; a pressure reducing valve designed to reduce the line pressure from a hydraulic pump in accordance with the vehicle speed, etc.; a torque converter valve for adjusting the hydraulic oil pressure to be supplied to the torque converter 20; a damper clutch control valve 52 (mentioned later), etc.

Figure 3:
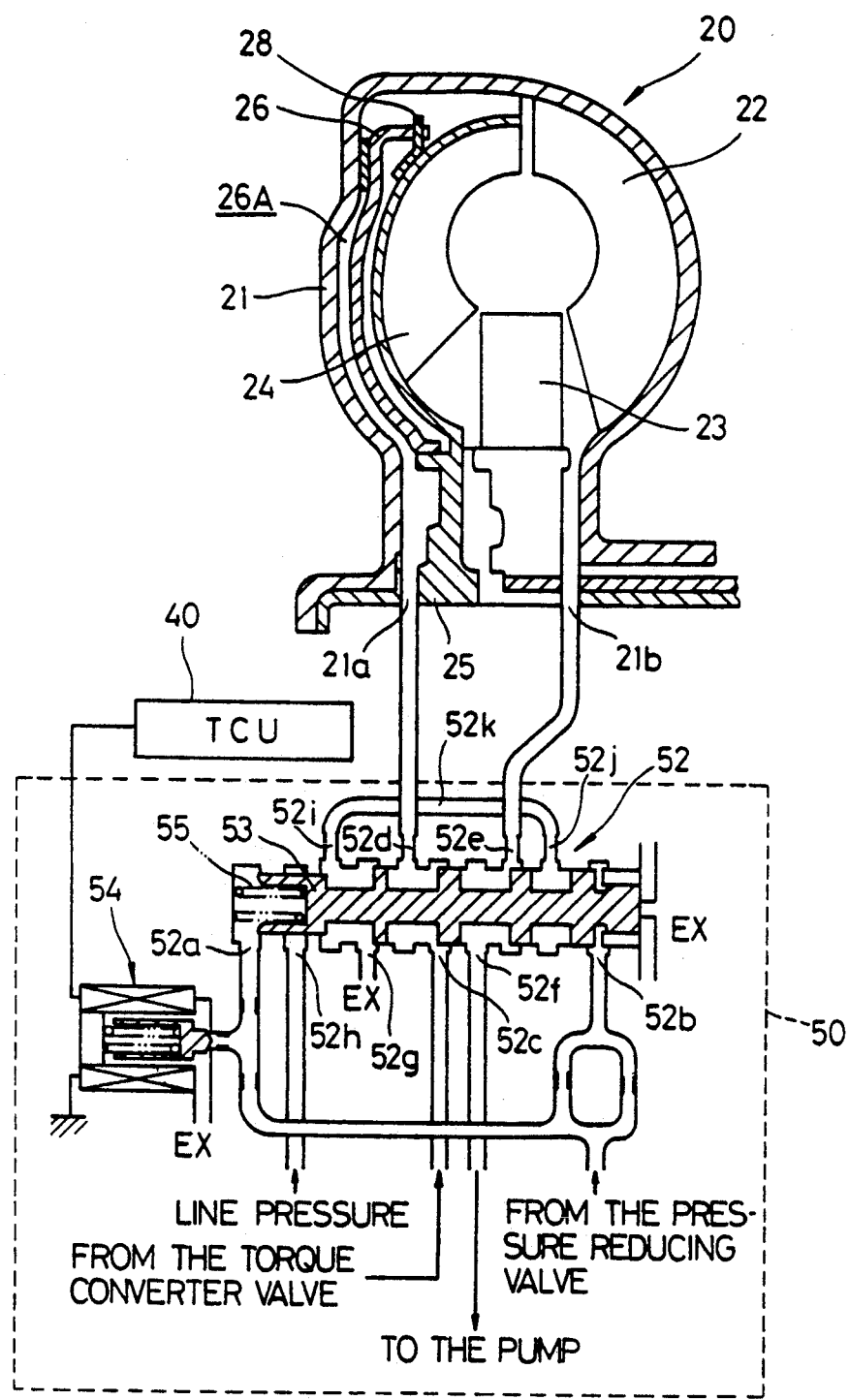
FIG. 3 is a hydraulic circuit diagram showing essential parts of a torque converter 20 and a hydraulic control unit of the automatic transmission shown in FIG. 2.

FIG. 3 shows the torque converter 20, and the damper clutch control valve 52 of the hydraulic control unit 50 for supplying hydraulic oil to the torque converter. A front cover 21 of the torque converter 20 and an impeller 22, serving as the inputside driving force transmitting element, are coupled to the crankshaft of the engine via a drive plate (not shown), so that the front cover and the impeller rotate in unison with the crankshaft when the engine runs. A turbine 24, serving as the output-side driving force transmitting element, is rotatably received in the front cover 21, and is fixed on the output shaft 25 (input shaft of the gear transmission 10). The torque converter 20 is arranged to carry out a normal operation when the damper clutch 26 of the direct-coupling mechanism (mentioned later) is in a released state, so that torque transmission between the impeller 22 and the turbine 24 is achieved through the hydraulic oil. The damper clutch 26, which is installed between the turbine 24 and the front cover 21, is coupled to the turbine 24 through a lock ring 28 for rotation in unison with the turbine.

A space 26A defined between the damper clutch 26 and the front cover 21 is communicated with a port 21a of the torque converter 20. When the hydraulic oil is supplied to the space 26A via the port 21a, the hydraulic oil pressure acts on the damper clutch 26 to cause the same to move in the direction away from the front cover 21, i.e., to cause the damper clutch 26 to slip. The torque converter 20 has another port 21b. When the line pressure (mentioned later) is supplied through the port 21b, the line pressure acts on a surface of the damper clutch 26 on the side remote from the space 26A, so as to depress the damper clutch 26 against the front cover 21. This causes the turbine 24 and the impeller 22 to rotate integrally, so that a slip amount is reduced to zero. In FIG. 3, reference numeral 23 represents a stator which is coupled to a casing 10a via a one-way clutch 29 (FIG. 2).

The hydraulic control unit 50, which is provided with a damper clutch control valve 52 and a solenoid valve 54, is operable to control the oil pressure applied to the damper clutch 26, by conducting ON-OFF control or duty control of the solenoid valve 54. More specifically, the damper clutch control valve 52 is provided with a spool 53 and a spring 55 which depresses the left end surface of the spool 53, so that the spool 53 is always urged by the spring 55 toward the right in the figure. The spool 53 having six lands is arranged to cause various ports to be opened and closed as the spool 53 is moved. Each of end surfaces of the lands receives the oil pressure supplied through corresponding ports. Namely, the ports 52a and 52b are supplied, through a pressure reducing valve (not shown), with the oil pressure acting on the left end land surface and the land surface near the right end of the spool 53. When the solenoid valve 54 is closed, the spool 53 is moved to the rightmost position illustrated in the figure because of the difference between the land surface areas, i.e., the difference between the oil pressure force acting in the right direction and that acting in the left direction, and the spring force produced by the spring 55. At this time, a port 52c and a port 52d are communicated with each other, so that the hydraulic oil supplied through a torque converter valve (not shown) is supplied to the port 21a of the torque converter 20 via the ports 52c and 52d. Also, a port 52e and a port 52f are communicated with each other, and hence the hydraulic oil discharged through the port 21b of the torque converter 20 is returned to an oil pump via the port 52e and 52f.

When the solenoid valve 54 opens, and hence the oil pressure acting on the land surface at the left end of the spool 53 is reduced, the spool 53 moves to the leftmost position. At this time, the above-mentioned port 52c and port 52f are communicated with each other, so that the hydraulic oil pressure from the torque converter valve is returned to the oil pump without being supplied to the torque converter 20. Further, the port 52d is communicated with a port 52g, and is connected to a drain. Thus, the hydraulic oil that has been applied until that time to the surface of the damper clutch 26 on the side close to the space 26A is discharged to the drain through the port 21a via the port 52d and 52g. Furthermore, ports 52i and 52j are connected to each other through an oil path 52k; the port 52i is communicated with a port 52h to which the line pressure is supplied, while the port 52j is communicated with the above-mentioned port 52e. Thus, the torque converter 20 is supplied with the line pressure through the ports 52h, 52i, 52j, 52e, and 21b. This line pressure acts on the damper clutch 26, so that the damper clutch is urged against the front cover 21.

Figure 1:
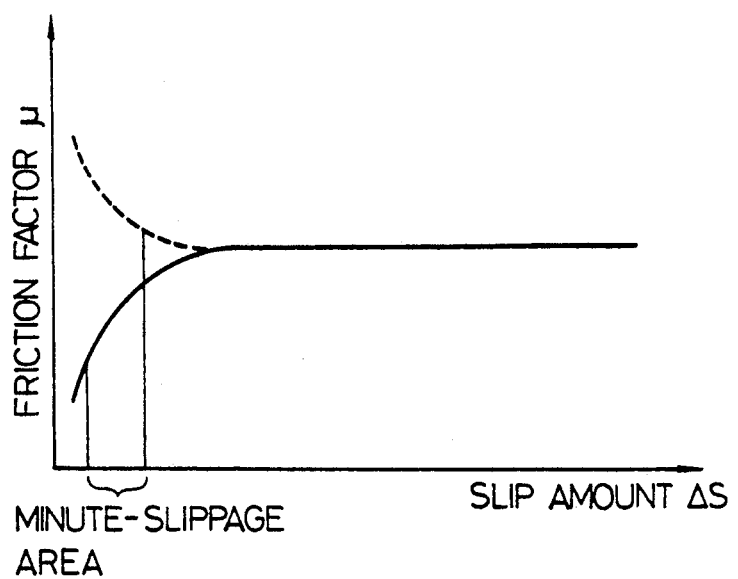
FIG. 1 is a graph for explaining a desired relationship between the slip amount $\Delta S$ and the friction factor $\mu$ in a damper clutch of a torque converter.

In the meantime, the hydraulic oil having the characteristic shown by the solid line in FIG. 1 is used as the hydraulic oil to be supplied to the torque converter 20. The usage of this hydraulic oil makes it possible to decrease the friction factor $\mu$ of the damper clutch 26, in an area where the slippage $\Delta S$ is extremely small, as the slip amount $\Delta S$ decreases.

The aforementioned solenoid valve 54 is connected to the output side of the TCU 40, and is subjected to ON-OFF control or duty control which is performed in accordance with drive signals from the TCU 40. Referring to FIG. 2 again, electrically connected to the input side of the TCU 40 are a turbine rotational rate sensor (Nt sensor) 42 for detecting the rotational rate Nt of the turbine 24 of the torque converter 20, an No sensor 43 for detecting the rotational rate No of the transfer shaft 12, an Ne sensor 44 for detecting the engine rotational rate Ne, a throttle opening ($\theta$t) sensor 46 for detecting the valve opening $\theta$t of a throttle valve disposed in the middle of an intake passage of the internal combustion engine 1, an oil temperature sensor (not shown) for detecting the temperature of the hydraulic oil supplied from the oil pump to the hydraulic control unit 50, etc. The detection signals from the aforementioned sensors are supplied to the TCU 40.

Figure 5:
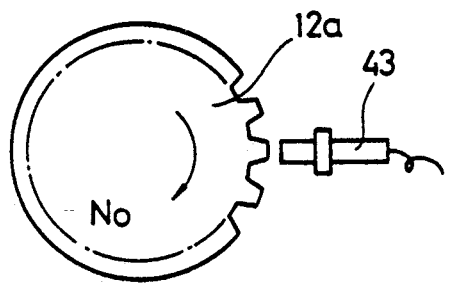
FIG. 5 is a diagram illustrating the location at which mounted is an No sensor 43 for detecting the rotational rate No of a transfer shaft 12 of the automatic transmission shown in FIG. 2.

As shown in FIG. 5, the No sensor 43 is disposed so as to face the outer periphery of a transfer shaft driven gear 12a fixed on the transfer shaft 12 (FIG. 2). The No sensor 43 produces a pulse signal every time each tooth of the gear 12a passes by (see FIG. 6 (B)), and the rotational rate No is calculated from the time interval of generation of the pulse signals. Meanwhile, the Nt sensor 42 may be omitted because the turbine rotational rate Nt can be calculated by multiplying the rotational rate No of the transfer shaft 12, detected by the No sensor 43, by a speed change ratio of a gear position established in the gear transmission 10.

The TCU 40 accommodates therein memories, such as a ROM and RAM, a central processing unit, an I/O interface, a counter, etc. which are not shown, and is arranged to perform transmission control (speed change control) and direct-coupling control in accordance with a control program stored in the memory concerned.

TRANSMISSION CONTROL

First, the TCU 40 carries out transmission control (speed change control) primarily in accordance with the position of the shift valve of the hydraulic control unit 50, the rotational rate No (vehicle speed) detected by the No sensor 43, and the throttle valve opening $\theta$t detected by the throttle opening sensor 46. This control does not particularly relate to the present invention, and hence detailed description thereof will be omitted. Briefly speaking, the TCU outputs the control signals to the hydraulic control unit 50 in accordance with the vehicle speed, etc. to supply the hydraulic oil to the aforementioned clutch and braking unit of the gear transmission 10, whereby changeover control is made to establish a desired gear position.

DIRECT-COUPLING CONTROL

Figure 4:
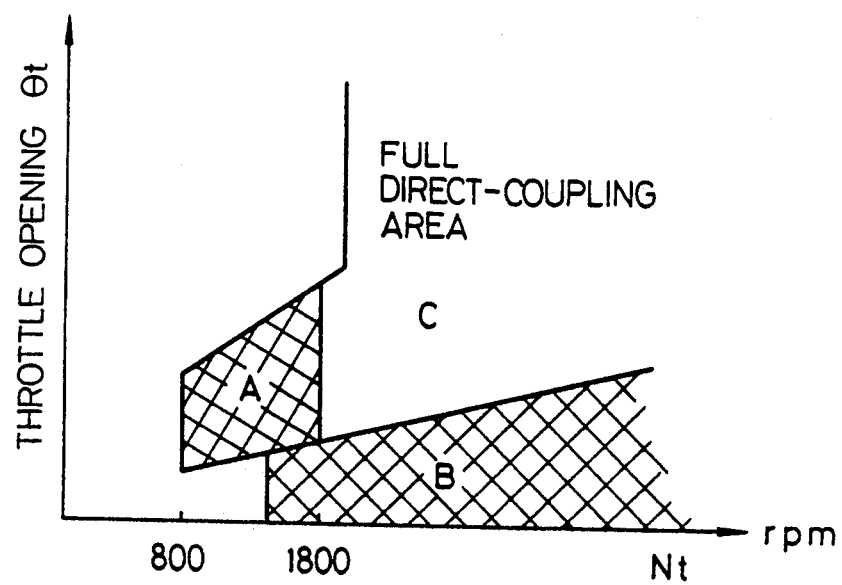
FIG. 4 is a graph showing control areas for a damper clutch 26, which areas are defined by the rotational rate Nt of an output shaft of the torque converter 20 and the throttle valve opening $\theta t$.

Then, the TCU 40 detects a control area of the damper clutch 26 determined by the turbine rotational rate Nt and the throttle valve opening, on the basis of these two parameters detected by the Nt sensor 42 and the throttle opening sensor 46, respectively. FIG. 4 illustrates, by way of example, various control areas of the damper clutch 26. In FIG. 4, an area C represents a full direct-coupling area wherein the slip amount of the damper clutch 26 is controlled to zero. In this area C, there is no fear of generating the "confined noise" or vehicle body vibration due to direct coupling even when the damper clutch 26 is so operated as to place the torque converter 20 in a full direct-coupling state. Areas A and B, which are a low engine speed area and a decelerating area, respectively, represent slip direct-coupling control areas wherein slight slippage is allowed. In these areas A and B, slight slippage is allowed because the "confined noise" or body vibration caused by direct coupling may take place if the damper clutch 26 is frictionally engaged with the front cover 21 to achieve the full direct-coupling state.

More specifically, when a speed change operation has been completed and if it is judged, according to the detected turbine rotational rate Nt and the detected throttle valve opening $\theta$t, that the control of the damper clutch 26 has entered the area C, then the TCU 40 executes the full direct-coupling control. To achieve the full direct-coupling control in this area C, the solenoid valve 54 of the hydraulic control unit 50 is energized (opened) to thereby cause the spool 53 of the damper clutch control valve 52 to move to its left end position, and the line pressure is supplied to the torque converter 20 through the control valve 52 to thereby actuate the damper clutch 26. In this case, the damper clutch 26 is urged against the front cover 21, so that the slip amount of the torque converter 20 is rendered to be zero.

If it is judged, according to the detected turbine rotational rate Nt and the detected throttle valve opening $\theta$t, that the control of the damper clutch 26 has entered the area A or B, then the TCU 40 executes the slip direct-coupling control. This control allows the torque converter 20 to have slight slippage, to thereby achieve an approximate direct-coupling condition. To this end, the magnitude of the hydraulic oil pressure supplied to the above-mentioned space 26A of the torque converter 20 is adjusted by duty control of the solenoid valve 54, such that the slip amount $\Delta S$ is controlled to be close to a target slip amount (e.g., 100 rpm) falling within a predetermined range. Thus, in the areas A and B shown in FIG. 4, the torque converter 20 is allowed to have slight slippage but is kept in the approximate direct-coupling state, so that the energy loss is reduced, leading to improved fuel efficiency. On the other hand, during the speed change operation or in control areas other than the above-mentioned areas shown in FIG. 4, the damper clutch 26 is released, so that the impeller 22 and the turbine 24 are placed in a non-direct-coupled state. Meanwhile, there are no particular limitations with regard to the full direct-coupling control method for the damper clutch 26 (i.e., the controlling method for shifting the damper clutch 26 from the slip state to the full direct-coupling state and vice versa), and the slip direct-coupling control method for controlling the slip amount to fall within the predetermined range. Various methods may be applied therefor.

If the hydraulic oil supplied to the torque converter 20 deteriorates during the extended use, the relationship between the slip amount $\Delta S$ and the friction factor $\mu$ of the damper clutch 26 changes to exhibit the characteristic indicated by the broken line in FIG. 1, so that there occurs a fear of generating direct-coupling vibration. In order to detect the direct-coupling vibration, various methods may be adopted. For instance, a sensor such as an accelerator sensor or a strain gauge may be provided. Instead of such a special sensor, existing sensors for transmission control or direct-coupling control may be utilized. Namely, the direct-coupling vibration can be detected from output signals of these sensors. Employed in this embodiment is a method wherein a variation in the transfer shaft rotational rate No is monitored during the slip direct-coupling control to thereby detect the direct-coupling vibration. In the following, with reference to FIG. 7 through FIG. 13, a direct-coupling control method according to the present embodiment will be explained in detail.

DETECTION OF DIRECT-COUPLING VIBRATION BY DETECTING A VARIATION IN THE ROTATIONAL RATE NO

Figure 7:
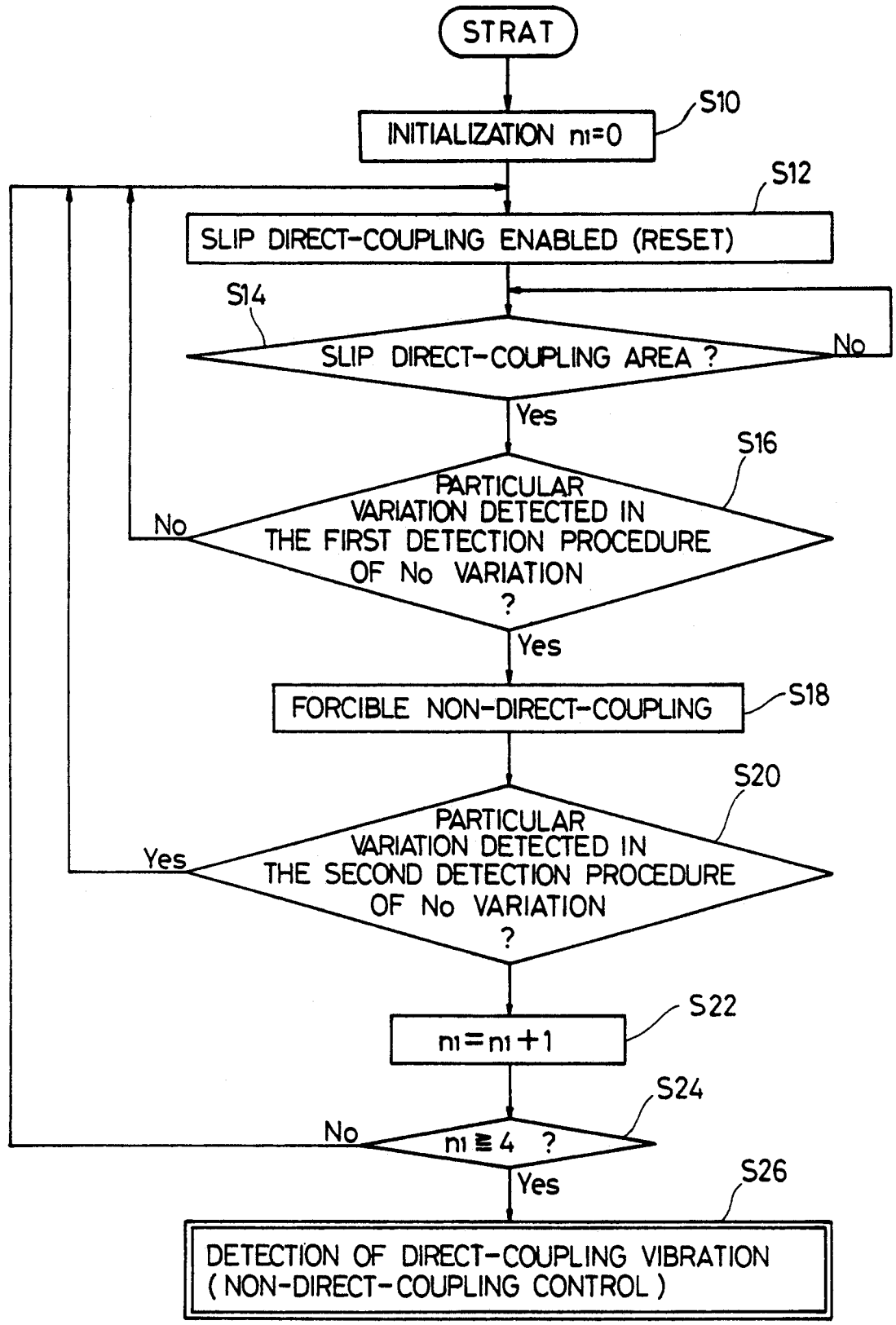
FIG. 7 is a flowchart showing a detection procedure according to a first embodiment of the present invention, which procedure is executed by a transmission control unit (TCU) 40 shown in FIG. 2 to detect direct-coupling vibration from a variation in the transfer shaft rotational rate No.

A direct-coupling vibration detecting program shown in FIG. 7, which is executed by the TCU 40, is started when the ignition key is turned on. First, at the step S10, the TCU 40 initializes a first count value n1 (n1=0) indicative of a number of times of detection of a particular variation in the transfer shaft rotational rate No by means of the later-mentioned detection. Then, the TCU sets the slip direct-coupling control enable flag (step S12). To set the control enable flag, however, various conditions including the following ones must be satisfied simultaneously; the temperature of the hydraulic oil of the torque converter 20 is higher than a predetermined temperature (e.g., 70° C.), the speed change operation has been completed, and the vehicle is being driven with a gear position other than the first gear. If these conditions are not satisfied, the TCU remains in a standby state at the step S12. Next, the TCU goes to the step S14 wherein a determination is made as to whether the damper clutch 26 is being controlled within the slip direct-coupling control area (the area A or B shown in FIG. 4). If the TCU finds that the damper clutch is not being controlled in that area, i.e., if the judgment result is negative (No), then the TCU enters into a standby state wherein the step S14 is repeatedly executed.

If the judgment result of the step S14 is affirmative (Yes), i.e., if the damper clutch 26 is subjected to the slip direct-coupling control, then the TCU proceeds to the step S16 wherein, in accordance with a first procedure (mentioned later in detail) of detecting a transfer shaft rotational rate variation, a variation in the rotational rate of the output shaft of the torque converter 20 is detected from a variation in the rotational rate No of the transfer shaft detected by the No sensor 43. If the variation in the rotational rate No detected by the first detection procedure falls within a permissible range, i.e., if the judgment result of the step S16 is negative, then the TCU goes back to the above-mentioned step S12. Thereafter, the TCU repeatedly implements the step S12 and the subsequent steps until a particular variation in the rotational rate No is produced.

On the other hand, if it is detected at the step S16 that a particular, impermissible change in the transfer shaft rotational rate No has occurred, then the TCU proceeds to the step S18 wherein it forcibly releases the damper clutch 26 to thereby interrupt the slip control (so that forced non-direct-coupling is achieved). Further, the TCU detects a variation in the rotational rate of the output shaft of the torque converter 20 again, from the rotational rate No detected by the No sensor 43 (step S20). A second procedure of detecting a transfer shaft rotational rate variation, which is carried out at the step S20 after the slip control is interrupted, is similar to the first detection procedure at the step S16. Detailed explanations of the second procedure will be also given hereinbelow. In the process of detecting a variation in the rotational rate No at the step S20, if the particular, impermissible variation in the rotational rate No is detected again, despite that the damper clutch 26 is forcibly operated in the non-direct-coupling mode, i.e., if the judgment result of the step S20 is affirmative, this indicates that the particular variation in the rotational rate No was caused by, e.g., a road surface condition transmitted through the wheels rather than being caused by the slip direct-coupling control of the damper clutch 26 that was carried out. In such a case, there will be no problem even if the slip direct-coupling control of the damper clutch 26 is resumed. Therefore, the TCU returns to the step S12 wherein the slip direct-coupling control enable flag is set. Accordingly, if the damper clutch 26 is in a condition where it should be controlled in the slip direct-coupling control area, then the slip direct-coupling control is resumed.

If the judgment result at the step S20 is negative, i.e., if the variation no longer appears in the rotational rate No after the damper clutch 26 is forcibly operated in the non-direct-coupling mode, this indicates that the variation in the rotational rate No which occurred while the damper clutch 26 was subjected to the slip direct-coupling control was generated due to the slip direct-coupling control. Accordingly, in this case, it is estimated that the hydraulic oil supplied to the torque converter 20 has deteriorated. The TCU proceeds to the step S22 wherein a value of "1" is added to the stored first count value n1, and the resultant value is stored as a new count value n1. Then, the TCU determines whether the count value n1 is equal to or larger than a predetermined value, e.g., 4 (step S24). If the predetermined value (=4) is not reached as yet, the TCU determines that it is inappropriate to finally conclude that the variation in the rotational rate No is generated due to the slip direct-coupling control. Then, the above-mentioned step S12 is entered again. On the other hand, if the count value n1 has reached the predetermined value (=4), the TCU finally concludes that the variation in the rotational rate No is generated due to the slip direct-coupling control, and hence sets a flag which indicates that the direct-coupling vibration has been detected (step S26). When the direct-coupling vibration is detected in this manner, the TCU causes a particular alarm lamp of a failure diagnosis unit (not shown) to light, whereby the detection of the direct-coupling vibration is indicated or stored. Further, the slip direct-coupling control of the damper clutch 26 is inhibited until a proper action such as renewal of the hydraulic oil is taken. To this end, different control other than the slip direct-coupling control, e.g., the non-direct-coupling control wherein the slip direct-coupling state between the impeller 22 and the turbine 24 via the damper clutch 26 is released is carried out. Whether the proper action has been taken or not can be discriminated by making a determination as to whether the aforementioned direct-coupling vibration detection flag is already reset or not. For instance, the resetting of the flag is made when the electrical connection to the terminals of a battery power supply, once disconnected for the proper action, is established again upon completion of the proper action. Once the direct-coupling vibration detection flag is reset, the slip direct-coupling control may be resumed.

The method of controlling the damper clutch 26 to be carried out after the direct-coupling vibration is detected and then the slip direct-coupling control is inhibited is not limited to the aforementioned non-direct-coupling control, but it may be any other control method which is capable of avoiding the direct-coupling vibration. For example, a method for decreasing or changing the slip direct-coupling area may be used. Further, the full direct-coupling control may be made although some "confined noise" may be generated.

Figure 8:
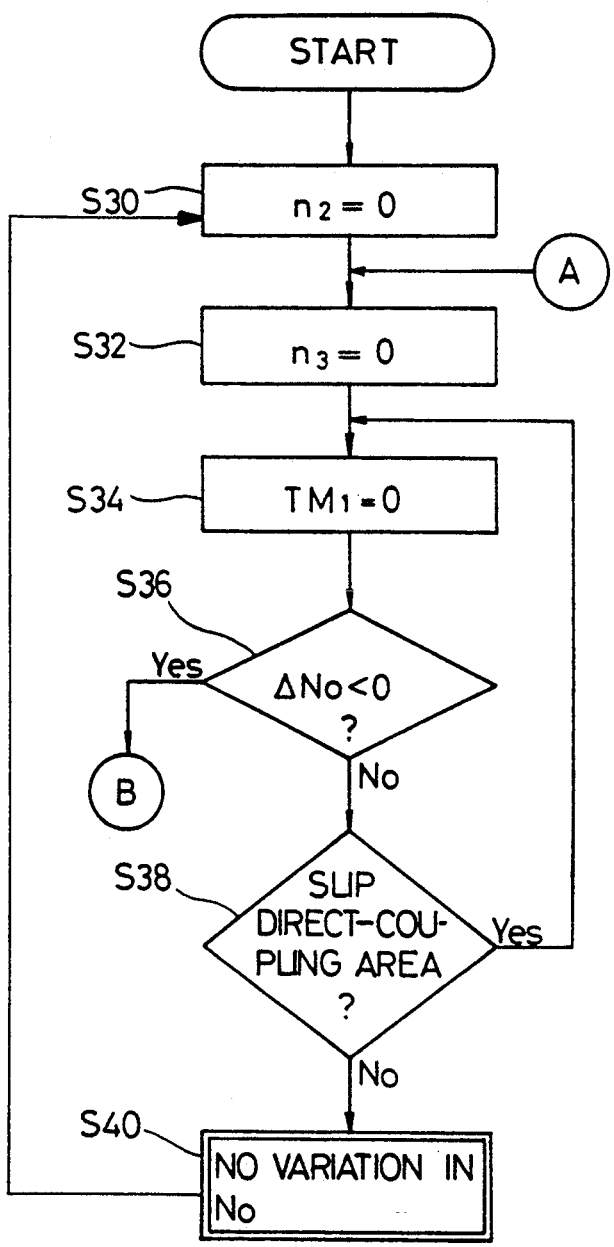
FIG. 8 is a flowchart showing an initial part of a first procedure for detecting a variation in the transfer shaft rotational rate, which procedure is executed by the transmission control unit (TCU) 40 and which constitutes part of the direct-coupling vibration detection procedure shown in FIG. 7.
Figure 9:
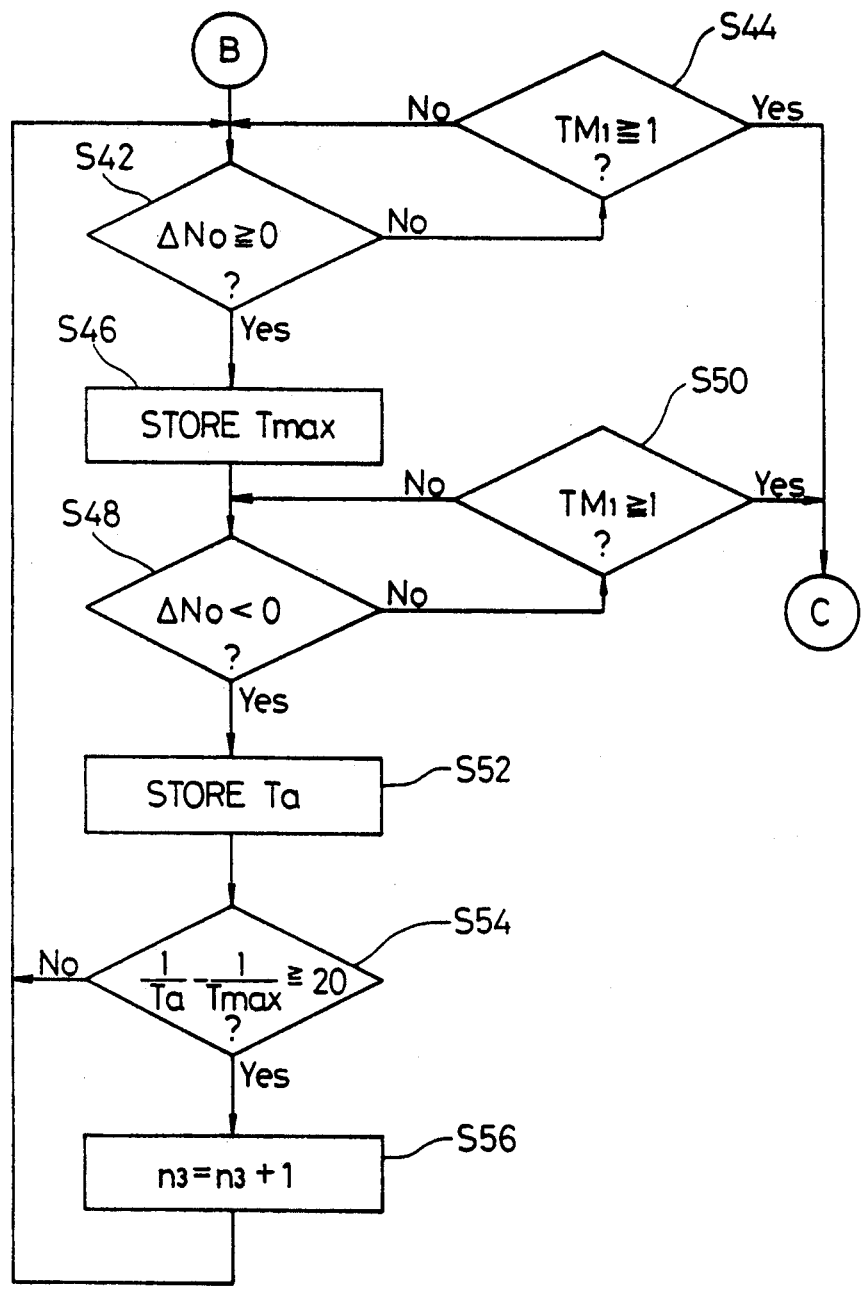
FIG. 9 is a flowchart showing an intermediate part of the first procedure for detection of the transfer shaft rotational rate variation.
Figure 10:
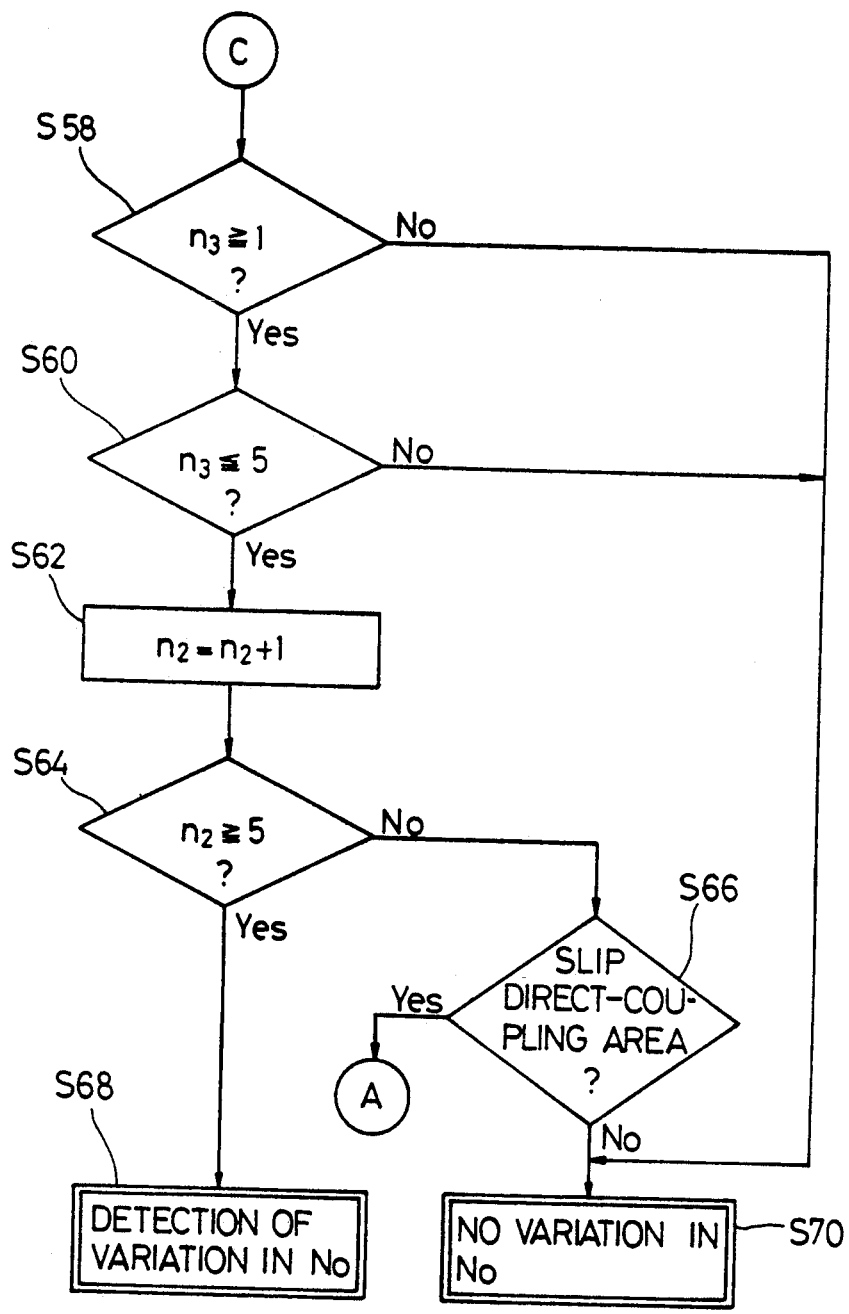
FIG. 10 is a flowchart showing the remaining part of the first procedure for detection of the transfer shaft rotational rate variation.

FIG. 8 through FIG. 10 show the first detection procedure which is carried out at the aforementioned step S16 of FIG. 7 for detecting an occurrence of the particular variation in the transfer shaft rotational rate No, i.e., an occurrence of the direct-coupling vibration. The TCU 40 first resets second and third count values n2, n3 and a first timer value TM1 to a value of "0," respectively, at the steps S30 through S34. The timer, which is a counter for measuring one arithmetic operation cycle (e.g., a value corresponding to 100 msec), operates to increment the timer value TM1 by an extremely small value each time a predetermined time period has elapsed, and judge that one operation cycle has been completed when the timer value reaches a predetermined value (e.g., 1). The count value n3 indicates a number of times of occurrences of that variation in the rotational rate No which exceeds a predetermined value during the one arithmetic operation cycle. A vibration frequency is detected from the count value n3. The count value n2 represents a number of times of continuous detection, during the operation in the slip direct-coupling control area, of that vibration whose frequency falls within a predetermined frequency range. The count values n2 and n3 are stored in the aforementioned memories.

Next, the TCU determines whether the difference ΔNo (=Non−Non−1) between the present value and previous value of the rotational rate No detected by the No sensor 43 is a negative value (step S36). If the difference ΔNo is not negative, the TCU judges at the next step S38 whether the damper clutch 26 is being controlled in the slip direct-coupling area, and goes back to the step S34 to reset the timer value TM1 to "0" again. Then, the TCU repeats the step S36 until the difference ΔNo becomes negative, i.e., the TCU enters into a standby state. If it is determined at the step S38 that the damper clutch 26 is not being controlled in the slip direct-coupling control area, the TCU proceeds to the step S40 to conclude that there has been no substantial variation in the rotational rate No, and resets a predetermined flag value to "0," for instance, whereby the above routine is completed. In this case, the TCU returns to the step S30 and resets the count value n2 to restart the routine.

Figure 6:
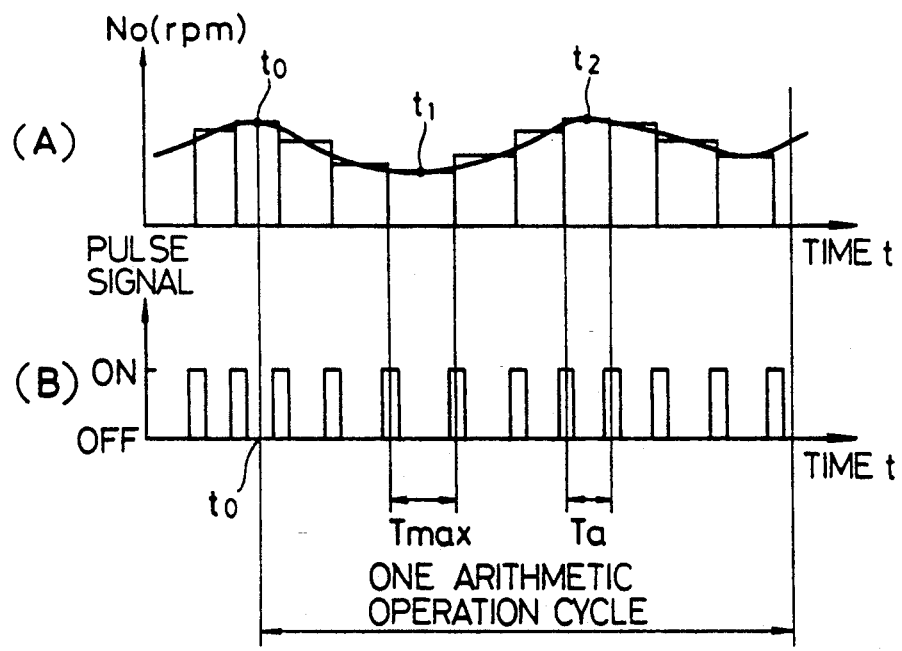
FIG. 6 is a graph showing the relationship between the generation of output pulse signals from the No sensor 43 and a time-dependent change in the rotational rate No of the transfer shaft 12 which is detected through the pulse signals.

If the judgment result at the step S36 is affirmative, i.e., if the difference ΔNo changes from a positive value to a negative value, then the TCU goes to the step S42 shown in FIG. 9. FIGS. 6 (B) and (A) show pulse signals delivered by the No sensor 43 and a time-dependent change in the rotational rate No calculated from the pulse signals, respectively. The shift of the difference ΔNo from positive to negative at the step S36 indicates that the detected rotational rate No has switched from increase to decrease. The timer, having been reset at the step S34, starts counting at the time point of t0 shown in FIG. 6. At the step S42, the TCU judges whether the difference ΔNo has changed from the negative value to a positive value or "0." In other words, the TCU determines whether the rotational rate No has switched from decrease to increase. If the judgment result is negative, the TCU determines at the step S44 whether the timer value TM1 has reached the predetermined value (=1), and then executes the step S42 again to remain in a standby state until the rotational rate difference ΔNo exceeds the value "0."

If the judgment result at the step S42 is affirmative, the TCU proceeds to the step S46 wherein a time interval between the present and previous pulse signals delivered from the No sensor 43 is stored as Tmax (near the time point of t1 in FIG. 6). Next, the TCU advances to the step S48 wherein a judgment is made as to whether the difference ΔNo is negative, and remains in a standby state until the difference ΔNo changes from a positive value to a negative value while monitoring the timer value TM1 (step S50). If the difference ΔNo changes to a negative value at the step S48, the TCU proceeds to the step S52 wherein a time interval of generation of pulse signals from the No sensor 43 at an instant at which the sign of the difference is inverted is stored as Ta (in the vicinity of a point t2 shown in FIG. 6).

The TCU 40 calculates the reciprocal values of the thus obtained pulse signal generation time intervals Tmax and Ta, to thereby determine a value corresponding to the rotational rate No. Further, the TCU determines whether the difference between the reciprocal values exceeds a predetermined value (e.g., a value of "20" corresponding to 50 rpm) (step S54).

$$(1/Ta) - (1/Tmax) \geq 20 \tag{A1}$$

If the formula (A1) is fulfilled, i.e., if the judgment result at the step S54 is affirmative, it means that the variation in the rotational rate No is greater than the predetermined value (50 rpm). In such a case, the TCU adds a value of "1" to the stored count value n3, and stores the thus updated value (step S56). On the other hand, if the formula (A1) is not fulfilled (if the judgment result at the step S54 is negative), the TCU returns to the step S42 without changing the count value n3. In this way, the TCU repeats the step S42 and the subsequent steps, so as to count how many times that variation in the rotational rate No which exceeds the predetermined value appears during one operation cycle. When the one operation cycle is completed with the timer value TM1 reaching the predetermined value (=1) at the step S44 or S50, the TCU advances to the step S58 shown in FIG. 10.

At the step S58 and the subsequent step S60, the TCU judges whether the count value n3 lies between a lower limit value (e.g., a value of "1") and an upper limit value (e.g., a value of "5"). The above judgment is made to discriminate a frequency of the vibration caused by the variation in the rotational rate No. During the slip direct-coupling control, if the vibration due to deteriorated hydraulic oil of the torque converter 20 occurs, the count value n3 has a frequency which corresponds to a value falling within the range defined by the aforementioned upper and lower limit values. Accordingly, if both the judgment results at the steps S58 and S60 are negative, it is concluded that no variation in the rotational rate No that leads to the direct-coupling vibration has taken place (step S70). In this case, e.g., the aforesaid predetermined flag representing that no variation in the rotational rate No has occurred is reset.

If both the judgment results at the steps S58 and S60 are affirmative, this indicates that the direct-coupling vibration has taken place during the slip direct-coupling control. In this case, the TCU adds a value of "1" to the stored count value n2, and stores the resultant value as an updated value (step S62). Next, the TCU judges whether the thus updated count value n2 is equal to or larger than a predetermined value, e.g., 5 (step S64). If the result of this judgment is negative, the TCU further judges at the step S66 whether the control is being carried out in the slip direct-coupling control area. In case that the control is being carried out in the slip direct-coupling control area, the aforementioned step S32 is entered again where the TCU resets the count value n3, and repeats the detection of the number of times of generation of variation in the rotational rate No during one operation cycle. On the other hand, during the detection, if a shift is made from the slip direct-coupling control area into other control area, i.e., if the judgment result at the step S66 is negative, then the TCU advances to the aforementioned step S70 to conclude that there has been no substantial variation in the rotational rate No.

If the judgment result at the step S64 is affirmative, i.e., if the direct-coupling vibration is continuously detected for the predetermined number of times (5 times) during the slip direct-coupling control, the step S68 is entered wherein it is concluded that the substantial variation has taken place in the rotational rate No, so that the aforementioned predetermined flag is set, for instance.

Figure 11:
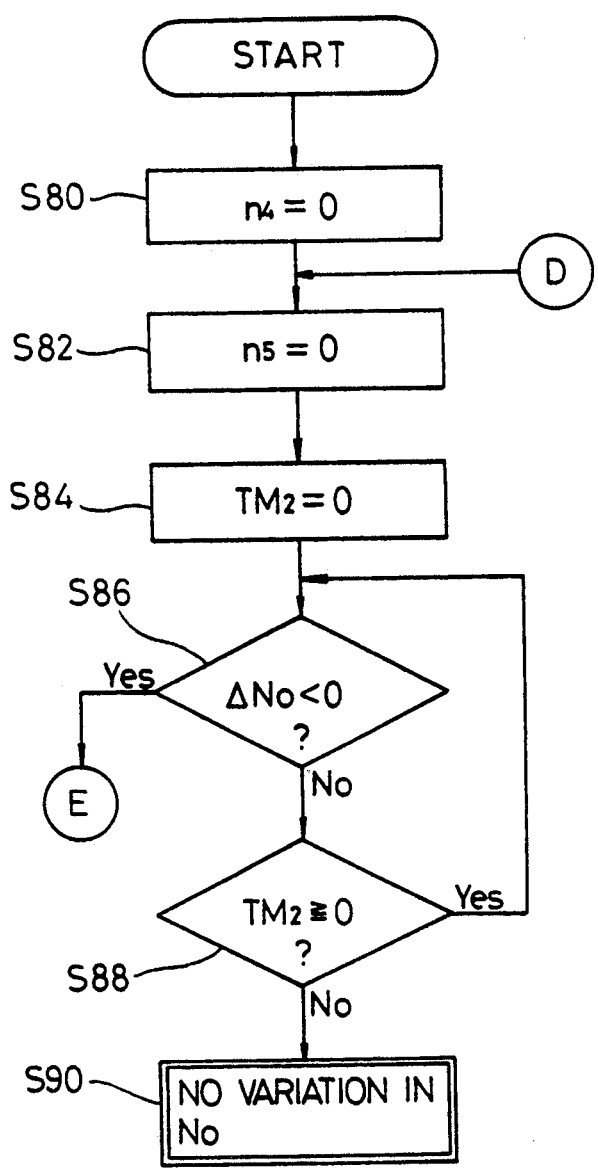
FIG. 11 is a flowchart showing an initial part of a second procedure for detection of the transfer shaft rotational rate variation, which procedure is executed by the transmission control unit (TCU) 40 after interruption of the slip direct-coupling control and which constitutes part of the direct-coupling vibration detection procedure shown in FIG. 7.
Figure 12:
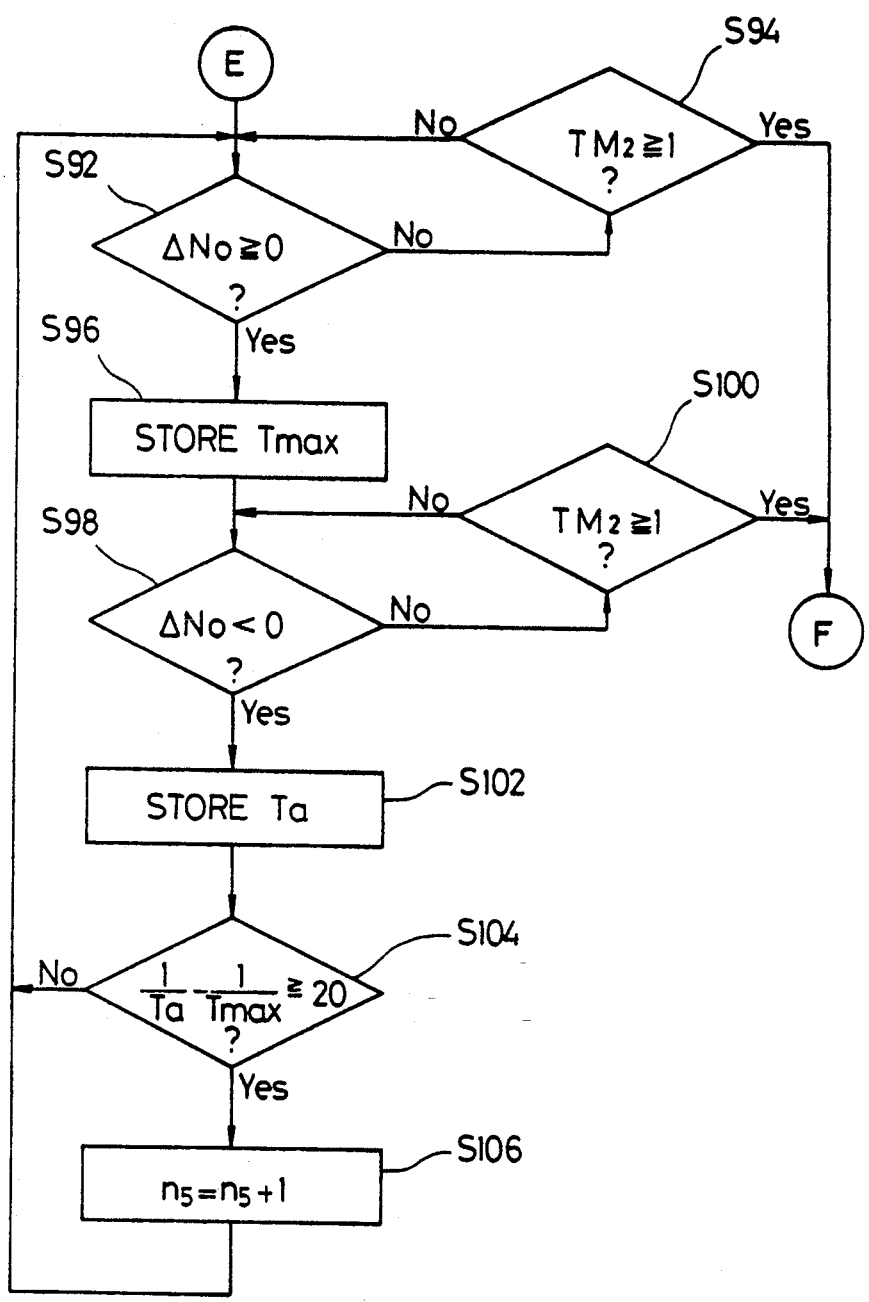
FIG. 12 is a flowchart showing an intermediate part of the second procedure for detection of the transfer shaft rotational rate variation.
Figure 13:
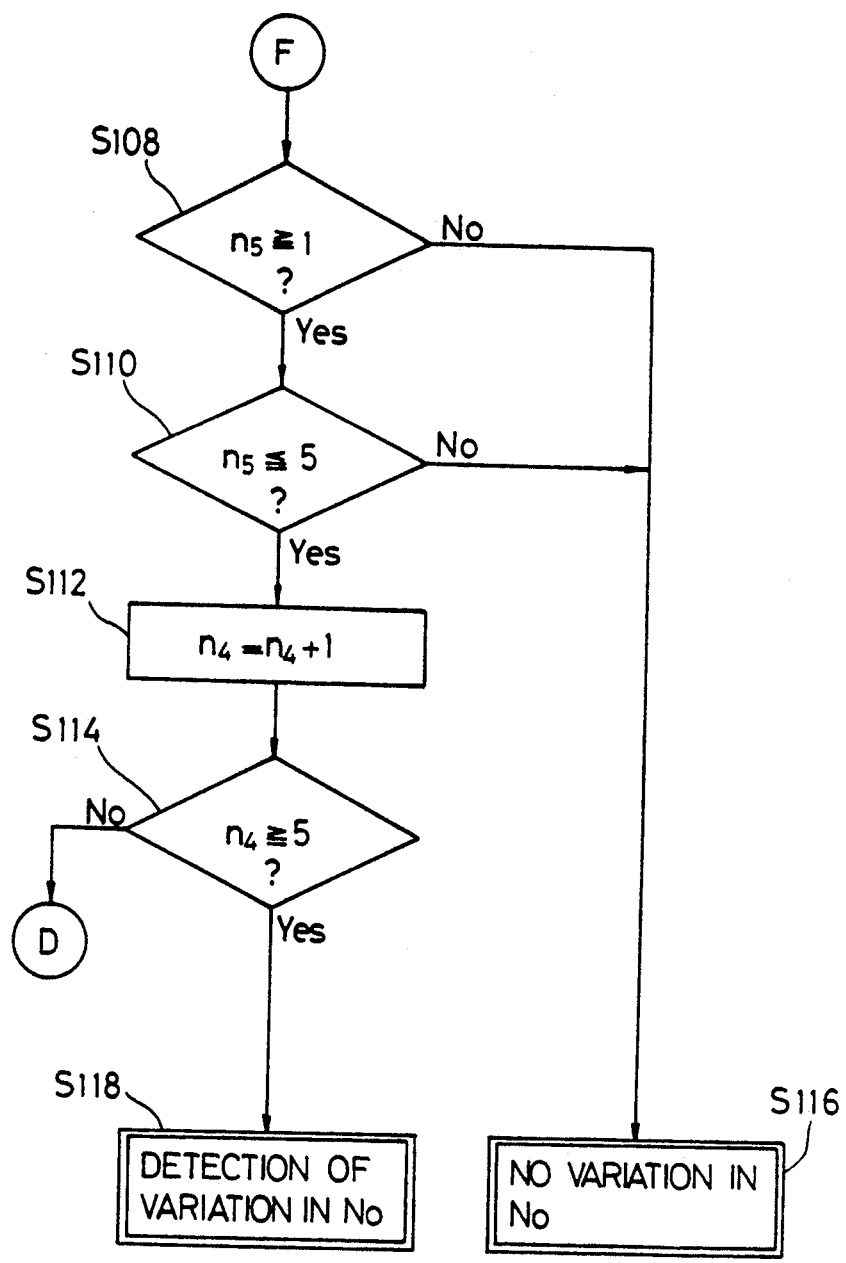
FIG. 13 is a flowchart showing the remaining part of the second procedure for the detection of the transfer shaft rotational rate variation.

FIG. 11 through FIG. 13 show the second detection procedure which is carried out in the aforementioned step S20 of FIG. 7 to make a judgment as to whether a particular variation in the rotational rate No is detected, that is, whether the direct-coupling vibration is detected again after the damper clutch 26 is forcibly switched to the non-direct-coupling mode. The second detection procedure is substantially the same as the first detection procedure which has already been explained with reference to FIG. 8 through FIG. 10; therefore, only a brief description will be given.

The TCU 40 first resets fourth and fifth count values n4, n5 and the second timer value TM2 to "0," respectively, at the steps S80 through S84. These count values n4 and n5, and the timer value TM2 are used for the same purpose as the aforementioned count value n2, etc. The timer operates to measure one arithmetic operation cycle (e.g., a value corresponding to 100 msec). The count value n5 indicates the number of times of generation of that variation in the rotational rate No during the one operation cycle which exceeds a predetermined value. The count value n4 indicates the number of times of continuous detection of that vibration which falls within a particular frequency range and which is detected continuously during the operation in the slip direct-coupling control area.

Next, the TCU judges whether the difference $\Delta No$ ($=Non-Non-1$) between the present and previous values of the rotational rate No detected by the No sensor 43 is a negative value (step S86), and if it is not negative, the TCU further judges whether the timer value TM2 has reached a predetermined value (=1) at the next step S88. Then, the step S86 is entered again and is repeated until the difference $\Delta No$ changes to a negative value, so that the TCU remains in a standby state. During the standby state, if the timer value TM2 reaches the predetermined value at the above-mentioned step S88, then TCU goes to the step S90 wherein it concludes that there has been no variation in the rotational rate No, so that the predetermined flag value is reset to "0," for instance, whereby the routine mentioned above is completed.

If the judgment result at the step S86 is affirmative, i.e., if the difference $\Delta No$ changes from a positive value to a negative value, then the TCU goes to the step S92 shown in FIG. 12. The steps S92 and S94 are the steps wherein the TCU waits until the difference $\Delta No$ shifts from a negative value to a positive value or zero. When the rotational rate No switches from decrease to increase and hence the judgment result at the step S92 becomes affirmative, the TCU proceeds to the step S96 where it stores as Tmax a time interval of generation of pulse signals issued from the No sensor 43. Next, the step S98 is entered wherein the TCU judges whether the difference $\Delta No$ is negative, and remains in a standby state until the difference $\Delta No$ switches from a positive value to a negative value while monitoring the timer value TM2 (step S100). When the difference $\Delta No$ changes to a negative value at the step S98, the TCU proceeds to the step S102 wherein the time interval of generation of the pulse signals from the No sensor 43 at that time point at which the sign of the difference is inverted is stored as Ta.

Further, the TCU determines whether a difference between the reciprocal values of the pulse signal generation time interval Tmax and Ta exceeds a predetermined value (e.g., a value of "20" corresponding to 50 rpm), i.e., whether the above formula (A1) is fulfilled (step S104).

If the relationship represented by the above formula (A1) applies, it means that the variation in the rotational rate No is greater than the predetermined value (50 rpm). In such a case, the TCU adds a value of "1", to the stored count value n5, and stores the thus updated value (step S106). If the formula (A1) does not apply, on the other hand, the TCU returns to the step S92 without adding any change to the count value n5. In this way, the TCU repeats the step S92 and the subsequent steps so as to count how many times that variation in the rotational rate No which exceeds the predetermined value occurs during one arithmetic operation cycle. When the arithmetic operation cycle is completed with the timer value TM2 reaching the predetermined value at the step S94 or S100, the TCU advances to the step S108 in FIG. 13.

At the step S108 and the subsequent step S110, the TCU judges whether the count value n5 determined as described above lies between a lower limit value (e.g., a value of "1") and the upper limit value (e.g., a value of "5"). This judgment is intended to discriminate a frequency of the vibration caused by a variation in the rotational rate No, as in the aforementioned case. If the judgment results of the steps S108 and S110 are both negative, then the TCU concludes that no particular variation in the rotational rate No, corresponding to the direct-coupling vibration, has taken place (step S116). In this case, the foregoing predetermined flag value is reset, for instance.

If the judgment results of the steps S108 and S110 are both affirmative, it means that vibration similar to the direct-coupling vibration has taken place even after the slip direct-coupling control was interrupted. In this case, the TCU adds the value of "1" to the stored count value n4 and stores the same as an updated value (step S112). The TCU then judges whether the thus updated count value n4 is equal to or larger than a predetermined value (e.g., 5) (step S114). If the judgment result is negative, the TCU goes back to the aforementioned step S82 where the count value n5 is reset, and then repeats the detection of a number of times of occurrence of a variation in the rotational rate No during one operation cycle. On the other hand, if the judgment result at the step S114 is affirmative, i.e., if the vibration similar to the direct-coupling vibration is detected for a predetermined number of times (5 times) in succession after the slip direct-coupling control was interrupted, then the TCU proceeds to the step S118 wherein it concludes that a variation has taken place in the rotational rate No due to a road condition or the like. Thus, the aforementioned predetermined flag is set, for instance.

In the above embodiment, the presence/absence of a variation in the rotation of the output shaft of the torque converter 20 is checked by detecting the rotational rate No of the transfer shaft 12 and by checking the presence/absence of a variation in the rotational rate No. However, the checking method is not limited thereto, but such a variation may be directly detected from the rotational rate Nt of the turbine 24. In this case, the rotational rate Nt may be detected direct from the Nt sensor 24. Alternatively, the turbine rotational rate Nt obtained, as mentioned above, by multiplying the rotational ratio of a gear position currently established, may be used as the rotational rate Nt.

With reference to FIG. 14 through FIG. 19, a direct-coupling control method according to a second embodiment of the present invention will be now explained.

As compared with the aforementioned first embodiment in which the direct-coupling vibration is detected from the transfer shaft rotational rate No, the second embodiment differs from in that the direct-coupling vibration is detected by monitoring a variation in the slip amount $\Delta S$ during the slip direct-coupling control, while this embodiment is the same as the first embodiment in other aspects such as the construction of the automatic transmission. Therefore, description of the points common to the first and second embodiments will be omitted herein.

Figure 14:
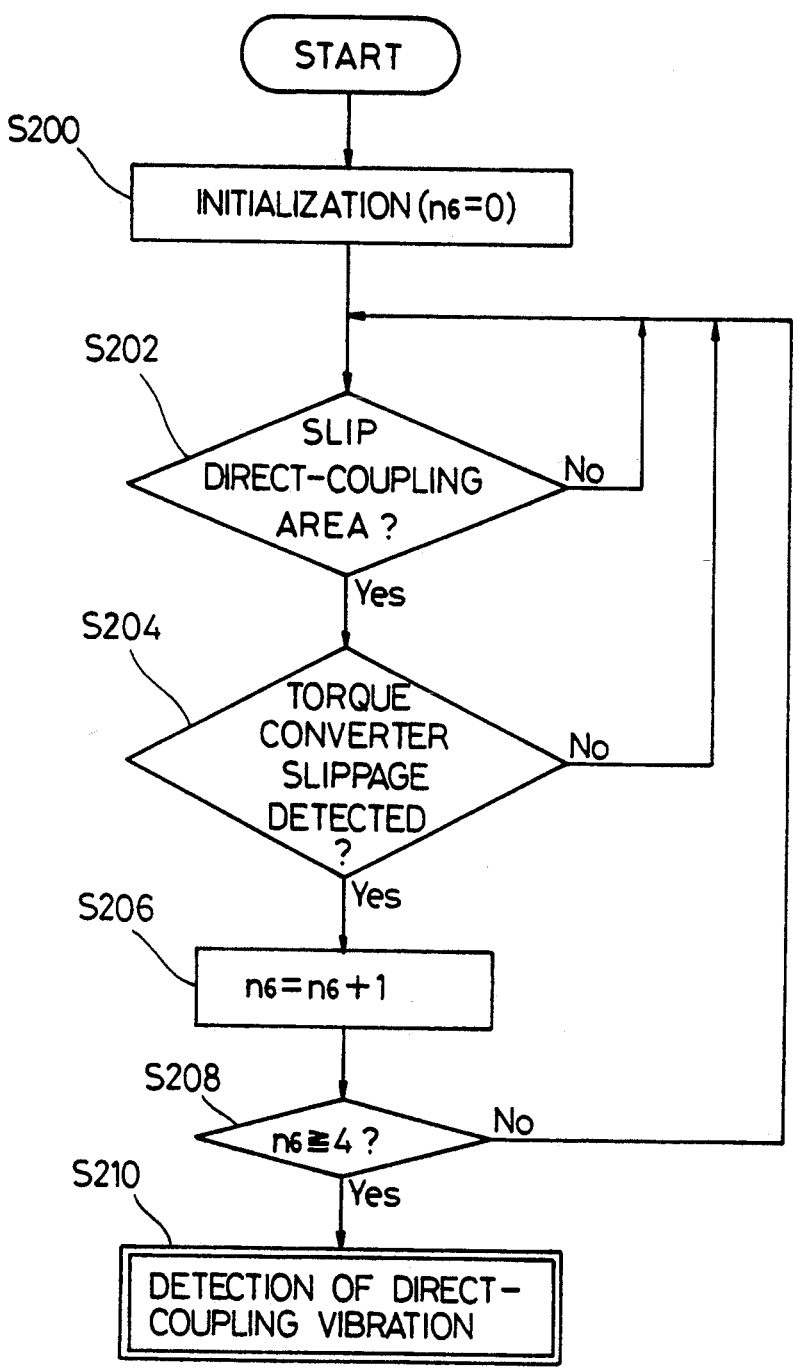
FIG. 14 is a flowchart showing a detection procedure according to a second embodiment of the present invention, which procedure is executed by the transmission control unit (TCU) 40 shown in FIG. 2 to detect direct-coupling vibration from a variation in the slip amount $\Delta S$.
Figure 15:
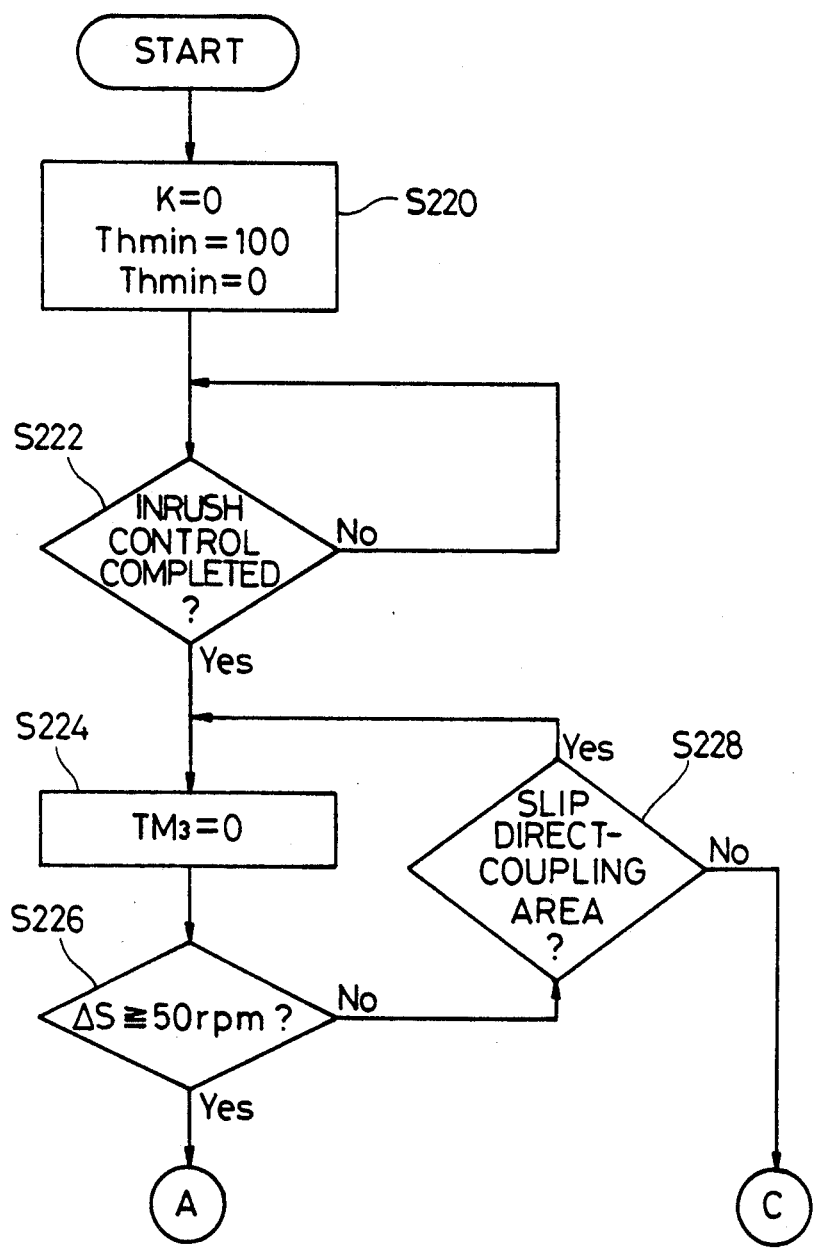
FIG. 15 is a flowchart showing an initial part of a detection procedure for detecting a variation in the slip amount in the torque converter 20, which procedure is executed by the transmission control unit (TCU) 40 and which constitutes part of the direct-coupling vibration detection procedure shown in FIG. 14.

DETECTION OF THE DIRECT-COUPLING VIBRATION BY DETECTING A VARIATION IN THE SLIP AMOUNT $\Delta S$ A direct-coupling vibration detecting program shown in FIG. 14 is executed by the TCU 40 when the ignition key is turned on. At the step S200, the TCU 40 first initializes a sixth count value n6 (n6=0) representative of a number of times of detection of a particular variation in the slip amount by means of the later-mentioned detection. Then, the TCU goes to the step S202 wherein it discriminates whether the damper clutch 26 is being controlled within the slip direct-coupling control area (area A or B shown in FIG. 4). If the TCU finds that damper clutch is not being controlled in that area, i.e., if the judgment result is negative (No), then the TCU repeats the step S202, so that the TCU remains in a standby state.

If the judgment result of the step S202 is affirmative (Yes), which means that the damper clutch 26 is subjected to the slip direct-coupling control, the step S204 is entered wherein the TCU detects slippage in the torque converter 20 (hereinafter referred to as "torque converter slippage"). Although a detailed explanation will be given in connection with a detecting method for determining whether a torque converter slippage is out of a permissible range (defined by predetermined upper and lower limit values), if a slip amount falls within the permissible range (if the judgment result of the step S204 is negative), then the TCU goes back to the above-mentioned step S202 and repeatedly implements the steps S202 and S204 until an impermissible torque converter slippage takes place. On the other hand, if it is detected at the step S204 that an impermissible torque converter slippage has occurred, an occurrence of direct-coupling vibration is estimated. Thus, the TCU proceeds to the step S206 wherein a value of "1," is added to the stored count value n6, and the resultant value is stored as an updated count value n6. Next, the TCU determines whether the updated count value n6 exceeds a predetermined value, e.g., 4 (step S208). If the count value n6 has not yet reached the predetermined value (=4), the aforementioned step S202 is entered again because it is inappropriate to finally conclude that a torque converter slippage has happened. If the count value n6 has reached the predetermined value (=4), on the other hand, the TCU concludes that the direct-coupling vibration has occurred, so that a flag which indicates that the direct-coupling vibration has been detected is set (step S210). When the direct-coupling vibration is detected in this manner, the TCU causes a particular alarm lamp of the failure diagnosis unit (not shown) to light to thereby store the detection of the direct-coupling vibration. Further, the slip direct-coupling control of the damper clutch 26 is inhibited until a proper action such as renewal of the hydraulic oil is taken, and different control other than the slip direct-coupling control, e.g., the non-direct-coupling control is carried out, as in the case mentioned hereinabove. Whether such a proper action has been taken or not is discriminated by the direct-coupling vibration detection flag being reset when, for instance, the terminals of a battery power supply is disconnected and then reconnected. Once the direct-coupling vibration detection flag is reset, the slip direct-coupling control may be resumed.

The control method, which is to be carried out on the damper clutch 26 when the direct-coupling vibration is detected and then the slip direct-coupling control is inhibited, is not limited to the above-mentioned non-direct-coupling control, but it may be any other control method that ensures avoidance of the direct-coupling vibration. Accordingly, the full direct-coupling control may be performed although some "confined noise" may be generated.

FIG. 15 through FIG. 18 show a procedure which is carried out in the aforementioned step S204 of FIG. 14 to detect a torque converter slippage, i.e., the direct-coupling vibration. The TCU 40 first initializes at the step S220 a count value K to the value of "0," a minimum throttle valve opening value Thmin to a value of 100 (%), and a maximum throttle valve opening value Thmax to 0 (%). As mentioned later, the count value K represents a result of counting which indicates how many times the slip amount changes in a manner crossing predetermined upper and lower limits during a predetermined time period. The minimum and maximum throttle valve opening value Thmin, Thmax are variables used to store the minimum and maximum values of the throttle valve opening in the predetermined time period.

Next, the TCU 40 determines whether the slip amount has been sufficiently settled to a value close to the aforementioned target slip amount as a result of the direct-coupling control of the damper clutch 26 which was started following the entry into the slip direct-coupling control area, i.e., whether inrush control has been completed (step S222). If the inrush control has not yet been completed, then the TCU remains in a standby state, repeating the step 222 until the inrush control is completed.

When the inrush control is completed and hence the judgment result at the step S222 is affirmative, the step S224 is entered wherein the TCU resets a third timer value TM3 to a value of "0." The timer, serving as a counter for measuring a predetermined time period (e.g., a value corresponding to 4 sec), increments the timer value TM3 by an extremely small value each time a specified time period elapses, and judges that the predetermined time period has elapsed when a predetermined value (e.g., 50) is reached.

Next, the TCU determines whether or not the slip amount of the torque converter, i.e., the slip amount $\Delta S$ of the damper clutch 26 is equal to or smaller than a predetermined lower limit value (e.g., 50 rpm) which is set at a value smaller than the aforementioned target slip amount (100 rpm) (step S226). Here, the slip amount $\Delta S$ is determined as a difference (rpm) between the engine rotational rate Ne and the turbine rotational rate Nt as shown by the following formula (B1). Alternatively, a ratio (%) of the difference between the engine rotational rate Ne and the turbine rotational rate Nt to the engine rotational rate Ne may be calculated in accordance with the following formula (B2), and the calculation result may be used as the slip amount $\Delta S$. In the meantime, the turbine rotational rate Nt can be calculated by multiplying the transfer shaft rotational rate No by a speed change ratio of the gear position established in the gear transmission 10. Therefore, in computing the slip amount $\Delta S$ in accordance with the formula (B1) or the formula (B2), a product of the transfer shaft rotational rate No and the speed change ratio may be used in place of the turbine rotational rate Nt.

$$\Delta S = Ne - Nt \quad (B1)$$

$$\Delta S = (Ne - Nt) \times 100/Ne \quad (B2).$$

If the judgment result at the step S226 is negative, the TCU determines, at the step S228, whether the damper clutch 26 is being controlled in the slip direct-coupling control area, and executes the step S224 again to reset the timer value TM3 to "0." Then, the TCU remains in a standby state until the slip amount $\Delta S$ goes below the lower limit value. Meanwhile, during this standby state, if there occurs a shift to a condition such that the damper clutch 26 should be controlled in an area other than the slip direct-coupling control area, i.e., if the judgment result at the step S228 becomes negative, the TCU carries out the later-mentioned step S256, and then the step S262 is entered wherein it is concluded that no torque converter slippage has been detected, whereby the routine concerned is completed. For instance, a predetermined flag value is reset to "0," thereby storing that no torque converter slippage has been detected. In this case, if the routine concerned is carried out again, the TCU goes back to the step S220 to reset the count value K, etc. upon restart of the routine.

Figure 16:
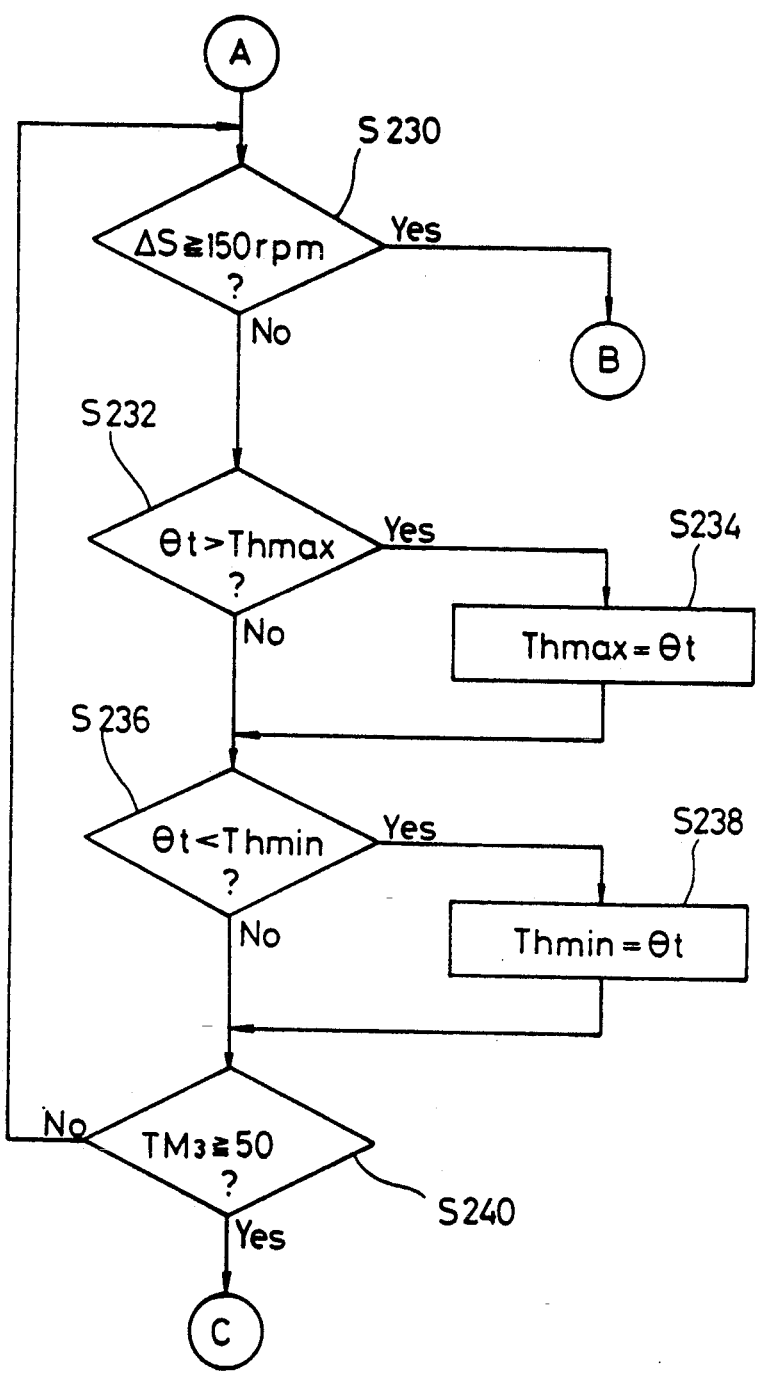
FIG. 16 is a flowchart showing an intermediate part of the slip amount variation detection procedure.

When the judgment result at the step S226 is affirmative, i.e., when the slip amount $\Delta S$ goes below the lower limit value (50 rpm), the step S230 shown in FIG. 16 is entered. At this time, the measurement of the timer value TM3 is virtually started (at the time point of t10 shown in FIG. 19). At the step S230, the TCU judges whether the slip amount $\Delta S$ exceeds a predetermined upper limit value (e.g., 150 rpm) which is set at a value greater than the aforementioned target slip amount (100 rpm). At a time point where the slip amount $\Delta S$ has just exceeded the lower limit value mentioned hereinabove, the judgment result is naturally negative, and hence the steps S232 through S240 are repeatedly implemented until the judgment result at the step S230 turns to affirmative. These steps are intended to store the maximum and minimum values of detected throttle valve openings $\theta t$. Namely, at the step S232, a determination is made as to whether a detected throttle valve opening $\theta t$ is greater than the stored maximum value Thmax. If so, the stored maximum value Thmax is renewed to the currently detected throttle valve opening $\theta t$, at the step S238. Further, at the step S236, whether or not the detected throttle valve opening $\theta t$ is smaller than the stored minimum value Thmin is determined. If so, the stored minimum value Thmin is renewed to the currently detected throttle valve opening $\theta t$, at the step S238. Moreover, at the step S240, whether or not the timer value TM3 has reached the predetermined value (=50) mentioned above. If not so, the step S230 and the subsequent steps are carried out again. In this way, the maximum value Thmax and the minimum value Thmin of the detected throttle valve opening are updated, as necessary, until the predetermined time period elapses (4 sec).

Figure 17:
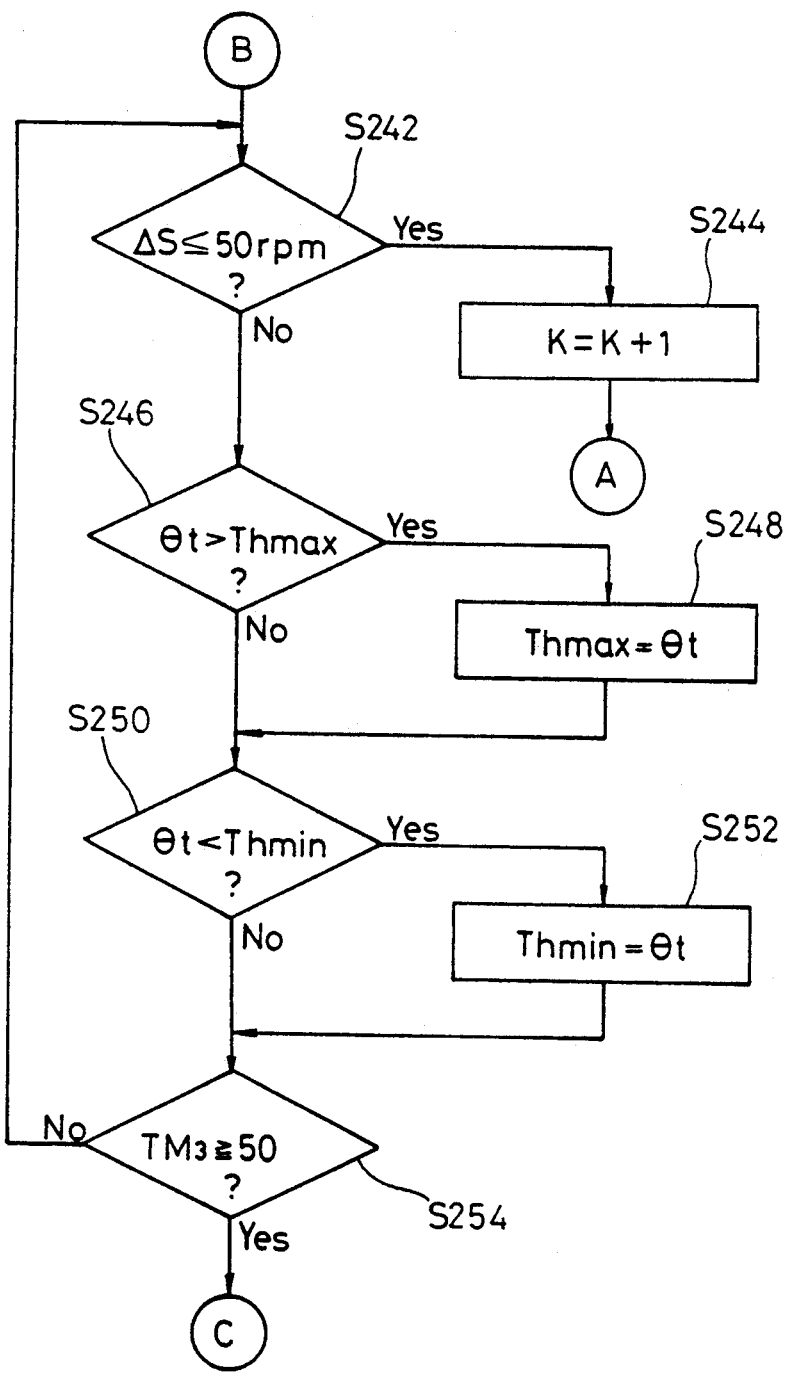
FIG. 17 is a flowchart showing another intermediate part of the slip amount variation detection procedure.

When the slip amount &S exceeds the upper limit value (150 rpm) (at the time point of t12 shown in FIG. 19), so that the judgment result at the step S230 becomes to be affirmative, the step S242 shown in FIG. 17 is entered. In this step S242, the TCU judges whether the slip amount $\Delta S$ has dropped below the lower limit value (50 rpm) again. At the time point at which the slip amount $\Delta S$ has just exceeded the upper limit value, the judgment result is negative, so that the steps S246 through S254 are executed repeatedly. Like the aforementioned steps S232 through S240, these steps are intended to sequentially update the minimum and maximum values Thmin, Thmax of detected throttle valve openings θt. Namely, the maximum value Thmax is updated at the steps S246 and S248, while the minimum value Thmin is updated at the steps S250 and S252. At the step S254, the timer value TM3 is compared with a predetermined value (=50), and if the timer value TM3 has not yet reached hid predetermined value, then the step S242 and the subsequent steps are carried out again.

When the slip amount ΔS changes to a value equal to or smaller than the lower limit value (50 rpm) (at the time point of t13 in FIG. 19), the step S244 is executed. In this step, a value of "1" is added to the stored count value K, and the thus updated value is stored. Next, the step S230 of FIG. 16 is entered again to check if the slip amount ΔS exceeds the upper limit value (150 rpm). In this way, the count value K is counted up by repeating the steps S230 through S244 in the same manner. More specifically, the count value K is incremented by a value of "1" each time the slip amount ΔS drops below the lower limit value after the slip amount ΔS exceeds the upper limit value, so that such a change in the slip amount ΔS is counted in sequence until the predetermined time period passes.

Figure 18:
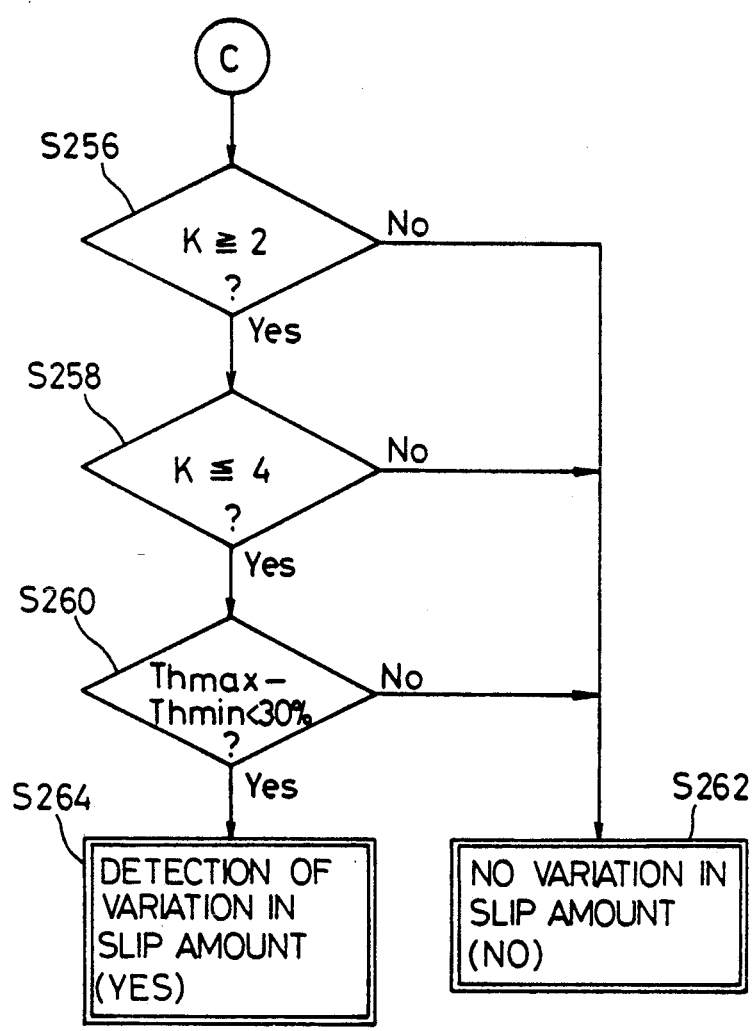
FIG. 18 is a flowchart showing the remaining part of the slip amount variation detection procedure.
Figure 19:
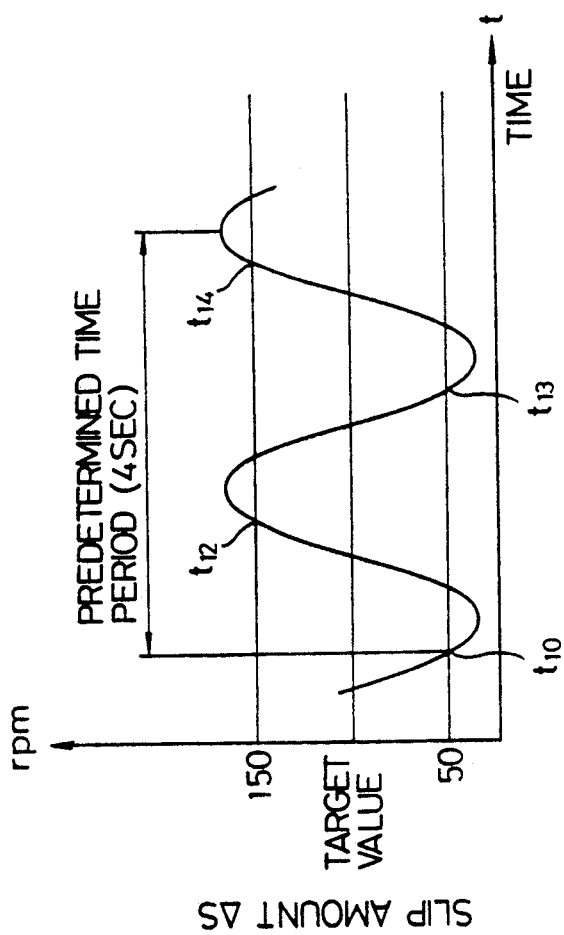
FIG. 19 is a graph showing a time-dependent change in the slip amount $\Delta S$.

At the aforementioned step S240 or S254, if the timer value TM3 is found to have reached the predetermined value (=50), then the TCU 40 proceeds to the step S256 shown in FIG. 18. The step S256 and the subsequent step S258 are intended to determine whether or not the torque converter slippage has occurred the predetermined number of times, e.g., two or more but four or less times, during the predetermined time period. In case that the direct-coupling vibration is caused by deteriorated hydraulic oil of the torque converter 20, it has been empirically found that the number of times of occurrence of such torque converter slippage falls in the aforementioned range. Accordingly, if the judgment result of either the step S256 or S258 is negative, it is determined that no torque converter slippage corresponding to the direct-coupling vibration has taken place (step S262). In this case, the aforementioned predetermined flag value indicating that no torque converter slippage has occurred is reset, for instance.

If the judgment results of the step S256 and S258 are both affirmative, it means that the torque converter slippage has occurred during the slip direct-coupling control. In this case, the TCU cheeks whether the throttle valve opening θt has changed during the above-mentioned predetermined time period to such an extent that the torque converter slippage is caused by the change of throttle valve opening. In other words, a significant change in the throttle valve opening θt during the predetermined time period means a sudden change in engine load, and this makes it easy for the torque converter slippage to happen; therefore it is difficult to determine whether the torque converter slippage leading to the direct-coupling vibration has taken place. More specifically, it is determined whether a difference between the maximum value Thmax and minimum value Thmin of the detected throttle valve opening is equal to a predetermined value (e.g., 30%) or less (step S260). If the judgment result is affirmative, i.e., if the torque converter slippage has taken place during the slip direct-coupling control, and if no significant change has occurred in the throttle valve opening θt, then the TCU determines that the torque converter slippage leading to the direct-coupling vibration has occurred, and hence, e.g., the predetermined flag mentioned above is set (step S264).

The present invention is not limited to the above-mentioned first and second embodiments, but various modifications thereof may be made.

For instance, in the first and second embodiments, to eliminate the need of a special sensor for detecting direct-coupling vibration, the direct-coupling vibration is detected from a corresponding one of changes in the transfer shaft rotational rate No and in the slip amount ΔS. Alternatively, a sensor such as an acceleration sensor or a strain gauge may be installed separately to detect the direct-coupling vibration.

In the second embodiment, a change of the slip amount ΔS which drops below the lower limit value (50 rpm) after it exceeds the upper limit value (150 rpm) is counted. Alternatively, a change of the slip amount ΔS may be counted, which exceeds the upper limit value after it drops below the lower limit value. Further, both of these changes may be counted.

In the second embodiment, the throttle valve opening θt is used as the parameter value which represents the engine load, but the present invention is not limited to that; the parameter may be fuel supply amount, air-intake amount, negative pressure in the intake passage, etc.

Further, the direct-coupling mechanism is not limited to the damper clutch 26 in the first and second embodiments. Instead, various clutch devices may of course be applicable.

In addition, the numerical values of the target slip amount, etc. given in the explanation of the first and second embodiments are shown by way of examples, and those numeral values may be modified, where necessary.

What is claimed is:

1. A direct-coupling mechanism control method for an automatic transmission in a vehicle including a driving force transmission installed between an internal combustion engine and an automatic transmission and which has an input-side driving force transmitting element coupled to a side of the internal combustion engine, an output-side driving force transmitting element coupled to the automatic transmission, and a direct-coupling mechanism for permitting the input and output-side driving force transmitting elements to be coupled to each other, for controlling a coupling state of the direct-coupling mechanism to be in any one of a fully direct-coupled state, in which the input and output-side driving force transmitting elements are integrally coupled to each other; a slip direct-coupled state, in which torque transmission is permitted such that a rotational speed difference between the input-side and output-side driving force transmitting elements falls within a predetermined range; and a non-direct-coupled state, in which the fully direct-coupled state and the slip direct-coupled state are released and in which torque transmission, through hydraulic oil, between the input and output-side driving force transmitting elements is permitted, the direct-coupling mechanism control method comprising the steps of:

(a) determining whether or not the internal combustion engine is running in at least one of a low rotation speed area and a decelerating area and controlling the direct-coupling mechanism to be brought in the slip direct-coupled state when it is determined that the internal combustion engine is running in at least one of the low rotation speed area and the decelerating area;

(b) determining whether or not a variation in a rotational rate of an input and output shaft of the automatic transmission goes beyond a first permissible range when the direct-coupling mechanism is controlled to be brought in the slip direct-coupled state;

(c) changing the direct-coupling mechanism from the slip direct-coupled state to the non-direct-coupled state when it is determined that the variation in the rotational rate of the input and output shaft of the automatic transmission goes beyond the first permissible range;

(d) determining whether or not the variation in the rotational rate of the input and output shaft of the automatic transmission goes beyond a second permissible range after the change to the non-direct-coupled state is made; and (e) detecting generation of direct-coupling vibration attributable to the slip direct-coupled state when it is determined that the variation in the rotational rate of the input and output shaft of the automatic transmission goes beyond the second permissible range.

2. The method of claim 1, wherein said step (a) is repeated when it is determined in said step (b) that the variation in the rotational rate of the input and output shaft of the automatic transmission falls within the first permissible range.

3. The method of claim 1, wherein said step (a) is repeated when it is determined in said step (d) that the variation in the rotational rate of the input and output shaft of the automatic transmission goes beyond the second permissible range.

4. A direct-coupling mechanism control method for an automatic transmission in a vehicle, including a driving force transmission installed between an internal combustion engine and an automatic transmission and which has an input-side driving force transmitting element coupled to a side o the internal combustion engine, an output-side driving force transmitting element coupled to the automatic transmission, and a direct-coupling mechanism for permitting the input and output-side driving force transmitting elements to be coupled to each other, for controlling a coupling state of the direct-coupling mechanism to be in any one of a fully direct-coupled state, in which the input and output-side driving force transmitting elements are integrally coupled to each other; a slip direct-coupled state, in which a rotational speed difference between the input-side and output-side driving force transmitting elements is brought in the vicinity of a target value which falls within a predetermined range; and a non-direct-coupled state, in which the fully direct-coupled state and the slip direct-coupled state are released and in which torque transmission, through hydraulic oil, between the input and output-side driving force transmitting elements is permitted, the direct-coupling mechanism control method comprising the steps of:

(a) determining whether or not the internal combustion engine is running in at least one of a low rotation speed area and a decelerating area and controlling the direct-coupling mechanism to be brought in the slip direct-coupled state when it is determined that the internal combustion engine is running in at least one of the low rotation speed area and the decelerating area;

(b) determining whether or not the rotational speed difference between the input-side and output-side driving force transmitting elements of the driving force transmission falls within an allowable range;

(c) storing a number of times by which the rotational speed difference changes such that the rotational speed difference of said step (b) is greater than an upper limit value which is larger than the target value, and is lower than a lower limit which is smaller than an target value; and (d) detecting generation of direct-coupling vibration attributable to the slip direct-coupled state when a predetermined number of times of the change in the rotational speed difference, stored in step (c), is reached.

5. The method of claim 4, further comprising the step of:

(e) detecting load of the internal combustion engine; said step (a) being repeated when a variation in the load of the internal combustion engine is detected, even if the predetermined number of times of the change in the rotational speed difference is reached.

* * * * *